(12) United States Patent
Shimizu et al.

(10) Patent No.: US 7,199,173 B2
(45) Date of Patent: Apr. 3, 2007

(54) AGGLOMERATE AND RESIN COMPOSITION CONTAINING THE SAME

(75) Inventors: Seiya Shimizu, Hyogo (JP); Hiroshi Shibata, Hyogo (JP)

(73) Assignee: Maruo Calcium Company Limited, Akashi (JP)

( * ) Notice: Subject to any disclaimer, the term of this patent is extended or adjusted under 35 U.S.C. 154(b) by 0 days.

(21) Appl. No.: 10/530,412

(22) PCT Filed: Oct. 14, 2003

(86) PCT No.: PCT/JP03/13127

§ 371 (c)(1),
(2), (4) Date: Apr. 7, 2005

(87) PCT Pub. No.: WO2004/035476

PCT Pub. Date: Apr. 29, 2004

(65) Prior Publication Data
US 2006/0052503 A1   Mar. 9, 2006

(30) Foreign Application Priority Data
Oct. 15, 2002   (JP)   ............................. 2002-300244

(51) Int. Cl.
C08K 3/26   (2006.01)
(52) U.S. Cl. ...................... 524/425; 106/464
(58) Field of Classification Search ................ 524/425; 106/464
See application file for complete search history.

(56) References Cited

U.S. PATENT DOCUMENTS

| 5,007,964 A | | 4/1991 | Tsukisaka et al. |
| 5,288,784 A | | 2/1994 | Minayoshi |
| 5,744,530 A | * | 4/1998 | Skelhorn ..................... 524/427 |

FOREIGN PATENT DOCUMENTS

| EP | 962812 | 7/1964 |
| JP | 43-3487 | 2/1968 |
| JP | 5-117443 | 5/1993 |
| JP | 05-117443 | 5/1993 |
| JP | 10-72215 | 3/1998 |
| JP | 2000-350920 | 12/2000 |
| JP | 3260881 | 12/2001 |
| JP | 3290881 | 12/2001 |
| JP | 2002-220547 | 8/2002 |
| WO | 99/51691 A1 | 10/1999 |
| WO | WO 99/51691 | 10/1999 |

OTHER PUBLICATIONS

International Search Report for corresponding International Application No. PCT/JP03/13127 dated Feb. 17, 2004.

* cited by examiner

Primary Examiner—Edward J. Cain
(74) Attorney, Agent, or Firm—Armstrong, Kratz, Quintos, Hanson & Brooks, LLP

(57) ABSTRACT

An agglomerate comprising fine primary particles of an inorganic compound except for silica is provided, satisfying $dp_{50}$: the average particle diameter [μm] of the agglomerate measured by Microtrac-FRA, a laser analysis type particle size distribution measurement apparatus, α: the value calculated by dividing the difference between the particle diameter $d_{90}$ of cumulative 90% minus sieve particles of the agglomerate and the particle diameter $d_{10}$ of cumulative 10% minus sieve particles of the agglomerate calculated by the Microtrac-FRA, Sw: the BET specific surface area [m²/g] of the agglomerate, St: the tensile strength [MPa] required to break the agglomerate with the particle diameter 4 μm, and, Sta: the tensile strength [MPa] required to break 30% of the particle diameter of the agglomerate with the particle diameter 4 μm, both St and Sta being measured by a micro compression testing machine manufactured by Shimadzu Corporation.

The agglomerate of the present invention provides a resin composition excellent in the anti-blocking property and the stretching resistance property.

13 Claims, 1 Drawing Sheet

AGGLOMERATE AND RESIN COMPOSITION CONTAINING THE SAME

TECHNICAL FIELD

The present invention relates to an agglomerate of an inorganic compound comprising agglomerated fine particles, and a resin composition containing the inorganic agglomerate. More particularly, the present invention relates to an agglomerate of fine primary particles of calcium carbonate capable of providing physical properties such as slipping property and anti-blocking without deteriorating optical properties such as haze and transparency to films, sheets, fibers and the like made of synthetic resins, and a resin composition containing the agglomerate.

BACKGROUND ART

Synthetic resins have been used widely, owing to their excellent physical and chemical properties, in a variety of industrial fields such as fibers, films and sheets and other various formed products.

For example, owing to its properties such as transparency and toughness, polypropylene film has been used in a variety of fields, e.g., overlapping wrapping materials for foods, tobacco, cassette tapes and the like, and synthetic paper materials.

For example, polyethylene terephthalate has been used in large quantities for magnetic recording media, capacitors, thermal transfer ribbons, thermal stencil printing master plates, pre-paid cards in film and sheet fields; for rubber-reinforcing fibers for tier cords, V-belts, conveyer belts in fiber fields; and for various clothing materials.

These resin films and sheets are required to have a blocking preventing capability and a slipping property as physical properties needed at the time of handling for forming process and using them as products and fine particles are added to the resin films and sheets so as to make their surfaces properly uneven and provide such physical properties.

Examples of a method for adding the fine particles to the resin films and sheets include: an external addition method for adding inorganic particles such as calcium carbonate, titanium dioxide, silica, talc, kaolin, or zeolite to resins; and an internal precipitation method for precipitating fine particles in resins from residues or the like at the time of resin synthesis like the case of polyethylene terephthalate.

The external addition method is capable of adjusting the degree of the roughness to a certain extent by adjusting the particle size of the inorganic particles and is excellent in controllability of the addition amount and uniform dispersion in resins by adjustment before addition. However, since the affinity between particles and resins is inferior, gaps so-called voids are formed between the resins and particles and there may be caused adverse problems of deterioration of transparency of films and sheets, dissociation of particles from the resins, formation of slight scratches by particles and the like.

Since the internal addition method for precipitating the fine particles gives good affinity between the produced particles and resins, void formation and particle dissociation from the resins scarcely take place and high transparency and low haze can be obtained and thus this method is advantageous to provide physical properties which are difficult to achieve by techniques of the external addition method. However, it is difficult for the method to control the particle diameter of particles to be precipitated and to evenly disperse the particles in the resins; therefore, the method is incapable of providing the resin surface roughness as designed and thus cannot give the anti-blocking property and the slipping property.

In order to solve the above-mentioned problems, in general, precipitated or gel type silica is properly selected and used for a film made of polyolefin such as polypropylene resin or polyethylene resin. Such silica is in the form of an agglomerate basically comprising fine particles, and owing to kneading with a resin in the case of film production process and the stress attributed to resin drawing, the agglomerate is suitable to be properly dispersed in the resin. While suppressing void formation, dissociation of particles, and formation of small scratches following the stress of the resin drawing owing to the dispersion, such silica in the form of the agglomerate can be characterized in that the agglomerate with proper size forms proper film surface roughness after the dispersion.

Further, because of its agglomerate form, the silica contains voids in the particles and thus has a low density and as compared with particles having no voids, the number of the silica particles in the same weight and the same addition amount can be high and accordingly, it is advantageous to provide the properties such as the anti-blocking property and slipping property that are closely related to the number of particles.

Japanese Unexamined Patent Publication Nos. 64-4240 (1989) and 07-196316 (1995) describe study and development of surface treatment agents for providing proper roughness to the surface of resin films, and improving the affinity between inorganic particles and resins enhancing the granular properties such as particle diameter, sharpness and the like of inorganic particles, and propose methods for preventing the formation of voids and dissociation of the particles by carrying out surface treatment of the inorganic particles with the agents.

Further, for example, Japanese Unexamined Patent Publication No. 05-4812 (1993) discloses improvement of the affinity with resins by making the particle surface uneven by binding further smaller spherical silica to spherical silica having a sharp particle size distribution.

Additionally, Japanese Patent No. 3260881 discloses agglomerates (secondary particles) of primary particles of calcium carbonate with excellent particle properties and proposes that the affinity with resins should be improved by limiting the shorter diameter of the primary particles, the longer diameter of the secondary particles and their ratio.

As particles having voids, for example, Japanese Unexamined Patent Publication Nos. 2003-246617 and 03-197318 (1991) and Japanese Examined Patent Publication No. 08-18827 (1996) propose methods for producing meso-holes-bearing calcium carbonate usable for meso-porous materials having uniform meso holes by adding metal ion encapsulating agents to slaked lime solutions and blowing carbonic acid gas to the solutions while adding the metal ion encapsulating agents many times during the reaction and further, for example, Japanese Examined Publication No. 43-3487 discloses a method of adding water glass alone or water glass together with trinitriloacetic acid salt to milk of lime; Japanese Patent Nos. 1140546, 1140542 and 1023550 disclose production of agglomerate and encapsulated and twisted bodies by adding an oxycarboxylic acid, an aminopolycarboxylic acid, a copolymer of isobutylene and maleic acid, or a substance generally called as a chelating agent, which produces a copolymer by coordination with metal ion of a phosphoric acid salt, to milk of lime and blowing carbonic acid gas to the resulting solution for carrying out carbonation reaction to a middle extent so as to produce needle-like, spindle-like or chain-like fine particles and then further carrying out carbonation reaction, so-called vapor phase deposition.

The above-mentioned techniques satisfied or almost satisfied the requirements at that time when they were proposed, however today IT appliances such as mobile phones and personal computers, and FDP such as PDP and LCD have been developed to an extraordinary far extent and the requirements for magnetic recording properties, the electric properties and light diffusibility and the like have become very challenging and it has been highly desired to achieve further improvements.

Even with respect to the films for overlapping wrapping materials, which have been employed in wide application fields where the requirements for the physical properties have not been changed ever before, considerable cost down is required attributed to the recent social phenomena such as so-called price destruction or the like. For cost down, modification and improvements of production process such as saving the production time has been studied and along with today's tendency, the particles to be added are required to be more advantageous and suitable than before for innovative production process.

The above-mentioned precipitated or gel type silica for polyolefin films has been developed while its dispersibility being taken into consideration, however it is still insufficient and thus various problems have been left being unsolved.

For example, when dispersion occurs to an excess extent, films and sheets, which are products, cannot be provided with proper roughness and consequently, they cannot have surfaces with sufficient anti-blocking and slipping properties. Further, a large number of fine particles formed by the excess dispersion may adversely lower the product value, which is deterioration of the transparency and haze of the films.

On the contrary, when the dispersion is insufficient, agglomerates of silica are formed on the films to result in decrease of the product value. Further, dispersibility of silica may differ among respective lots and the dispersion conditions in the production process have to be adjusted. Further, even when same polypropylene resins are used, in the case of using resins with different grades such as melt flow rates or the like, further delicate adjustments are required for production (dispersion) conditions.

Further, since silica has silanol groups in the particle surface, which are water-adsorptive and also since it has a high specific surface area, it contains water in an amount as high as 5 to 7% by weight. In the case of polyolefin films and sheets, for which resins have to be melted inevitably by heating to 150 to 250° C. during the production process involving steps of such as kneading and elongating steps, the water may be foamed to lower the product value and make handling of them difficult and that is not preferable.

Further, in the case silica is used industrially in a large quantity, there may occur many problems, for example, it is required to take careful consideration of the hygienic matter such as silicosis.

The inventions disclosed in Japanese Unexamined Patent Publication Nos. 64-4240 (1989) and 07-196316 (1995) were free from problems of instability of dispersibility, water adsorption, or silicosis which are caused in the case of using silica and they were capable of producing films and sheets with surface roughness of a desired degree and providing the anti-blocking property and the slipping property to the films and the sheets as designed.

Further, with respect to voids caused by drawing in the case of producing polyethylene terephthalate films by biaxial drawing, voids were not at all formed or even when they were formed, that was not so big issue in terms of physical properties or from a technical viewpoint at that time the inventions were accomplished. However, along with the progress of the techniques, thinner films have been required in these years and therefore, high stress has been applied at the time of drawing to result in significant void formation as compared with that by that time and it has become difficult to suppress voids and in some cases, such a phenomenon occurs that particles are broken and fail to provide the slipping property to films.

Further, because of the higher specific gravity of the particles themselves than that of silica, even when particles with the same size are added to films or sheets, the number of the projections in the surfaces is lessened than that in the case of using silica and consequently, that brings disadvantages from an economical viewpoint and therefore, the particles cannot be used for wide use films but only for relatively costly products such as magnetic recording media, capacitors and the like.

With respect to Japanese Unexamined Patent Publication No. 05-4812 (1993), owing to the extremely excellent dispersibility and high affinity with resins, it was studied to find whether the proposal was applicable to biaxially drawn polyethylene terephthalate for base films of capacitors and magnetic recording media, however silanol groups existing in the surfaces of fine silica particles and water adhering to them adversely hindered the resin synthesis, caused a gelling problem and formed foams at the time of resin synthesis and in such a manner, the proposal failed to solve the problems which the silica itself had.

Japanese Patent No. 3260881 proposes particles produced in ethylene glycol and particles produced by drying colloidal calcium carbonate by a spray drier or the like and then sintering the obtained products in carbonic acid gas atmosphere. As the particles produced in ethylene glycol, remarkably fine particles with uniform particle size can be obtained and since they can be obtained in the form of agglomerate of fine particles, it is similar to the case of silica, the invention is expected to compensate the disadvantages of the inventions of Japanese Unexamined Patent Publication Nos. 64-4240 (1989), 07-196316 (1995) and 05-4812 (1993) as well as to have advantageous points.

However, dispersibility owing to the stress applied by kneading and drawing is inferior to that of silica and as byproducts at the time of reaction, coarse particles undetectable by a particle size measuring apparatus are produced in a larger quantity than those produced in the inventions of Japanese Unexamined Patent Publication Nos. 64-4240 (1989) and 07-196316 (1995) and it results in a problem of inferior filtration and thus the issues relevant to voids, the anti-blocking property, the transparency are basically left being unsolved.

Further, in the case ethylene glycol is used for resins other than polyethylene terephthalate which is to be used as a raw material for resins, it is required to dry and evaporate ethylene glycol before adding to films and sheets. However, evaporation of ethylene glycol by drying is more difficult than evaporation of water required in the inventions of Japanese Unexamined Patent Publication Nos. 64-4240 (1989) and 07-196316 (1995) and the particles obtained after the drying do not maintain the similar particle size to that before and even when they are pulverized by dry pulverization, it is difficult to restore the particle size and particle diameter and that results in difficulty of formation of aimed surface roughness in films and sheets.

Incidentally, it is also difficult to use particles obtained by sintering dried bodies of colloidal calcium carbonate in carbonic acid gas atmosphere because of the same reasons described above.

Further, methods described in Japanese Unexamined Patent Publication Nos. 2003-246617 and 03-197318 (1991), Japanese Examined Patent Publication No. 08-18827, Japanese Patent Nos. 41262, 1140546, 1140542, and 1023550 all aim to increase the oil absorption of coated paper materials and the strength by adding particles to rubber and disclose inventions of enlarging the voids of particles, paying attentions to the voids.

However, these inventions are for applications to the coated paper, rubber and the like and although they have a concept relevant to the fineness of the particle size, the inventions naturally lack in adjustment of particle size and particle size distribution which are required for anti-blocking agents and slippage-providing agents for films and sheets and consideration of voids and scratching properties attributed to the stress caused at the time of kneading and drawing.

Accordingly, it has been difficult to use particles and products of these inventions for the anti-blocking agents and slippage-providing agents for films and sheets.

DISCLOSURE OF THE INVENTION

In view of such circumstances, the present invention provides particles providing good anti-blocking property and slipping properties while avoiding deterioration of transparency of films and sheets of resins and suppressing the haze by controlling the voids formed between the inorganic particles to be added and resins, and controlling the breakage and dispersion of the particles that are attributed to the stress caused at the time of kneading the particles with resins and drawing the resulting resins.

As a result of enthusiastic study by the present inventors for the purpose of solving the above problems, the present invention can provide an agglomerate, wherein fine primary particles of an inorganic compound are agglomerated; the particle diameter thereof can be freely set within a specific range; the particle size thereof is uniform; affinity with resin is excellent because portions of the surface of them follow the stress caused at the time of kneading and drawing; and adsorption of water to be a cause of gelling and foaming of resins is slight because of the absence of hydrophilic groups such as silanol groups in the particle surface. The present invention can also provide a resin composition containing the agglomerate for films, sheets, fibers and the like.

That is, as the first invention, claim 1 of the present invention provides an agglomerate comprising fine primary particles of an inorganic compound except for silica, the agglomerate satisfying the following expressions (a) to (e):

$$0.5 \leq dp_{50} \leq 20 \ [\mu m] \quad (a);$$

$$0 \leq \alpha \leq 2.5 \ [-] \quad (b);$$

$$30 \leq Sw \ [m^2/g] \quad (c);$$

$$20 \leq St \leq 150 \ [MPa] \quad (d); \text{ and}$$

$$200 \leq Sta \leq 600 \ [MPa] \quad (e),$$

wherein $dp_{50}$: the average particle diameter [μm] of the agglomerate measured by Microtrac-FRA, a laser analysis type particle size distribution measurement apparatus, α: the value calculated by dividing the difference between the particle diameter $d_{90}$ of cumulative 90% minus sieve particles of the agglomerate and the particle diameter $d_{10}$ of cumulative 10% minus sieve particles of the agglomerate calculated by the Microtrac-FRA, a laser analysis type particle size distribution measurement apparatus by the average particle diameter $dp_{50}$ according to the following equation:

$$\alpha = (d_{90} - d_{10})/dp_{50},$$

$d_{90}$: the particle diameter of cumulative 90% minus sieve particles of the agglomerate measured by the Microtrac-FRA, a laser analysis type particle size distribution measurement apparatus, $d_{10}$: the particle diameter of cumulative 10% minus sieve particles of the agglomerate measured by the Microtrac-FRA, a laser analysis type particle size distribution measurement apparatus, Sw: the BET specific surface area of the agglomerate $[m^2/g]$, St: the tensile strength [MPa] required to break the agglomerate with the particle diameter 4 μm, measured by a micro compression testing machine manufactured by Shimadzu Corporation, and Sta: the tensile strength [MPa] required to break 30% of the particle diameter of the agglomerate with the particle diameter 4 μm, measured by a micro compression testing machine manufactured by Shimadzu Corporation.

As a preferable embodiment, claim 2 of the present invention provides the agglomerate according to claim 1, wherein the solidified apparent density satisfies the following expression (f):

$$0.2 \leq \rho bp \leq 0.8 \ [g/cm^3] \quad (f),$$

wherein

ρbp: the solidified apparent density $[g/cm^3]$ of the agglomerate measured by a powder tester manufactured by Hosokawa Micron Co., Ltd.

As another preferable embodiment, claim 3 of the present invention provides the agglomerate according to claim 1 or 2, wherein the agglomerate is surface-treated with at least one kind selected from aliphatic acids, alicyclic carboxylic acids, aromatic carboxylic acids, their sulfonic acids and resin acids, their metal salts, ammonium salts, amine salts, esters; coupling agents; silicone oils; paraffin; copolymers of α,β-monoethylenically unsaturated carboxylic acids and monomers copolymerizable with α,β-monoethylenically unsaturated carboxylic acids, their metal salts, ammonium salts, amine salts, phosphoric acid esters; and industrial soaps.

As a further preferable embodiment, claim 4 of the present invention provides the agglomerate according to any one of claims 1 to 3, wherein the agglomerate comprises calcium carbonate.

Claim 5 of the present invention provides a resin composition containing a resin mixed with the agglomerate according to any one of claims 1 to 4.

As a preferable embodiment, claim 6 of the present invention provides the resin composition according to claim 5, wherein the resin is selected from polyolefin resins, polyester resins, polyamide resins, polyvinyl chloride resins, and biodegradable resins.

As a further preferable embodiment, claim 7 of the present invention provide the resin composition according to claim 5 or 6, wherein the resin composition is in the form of a film, a sheet or a fiber.

BEST MODE FOR CARRYING OUT THE INVENTION

Figure 1:
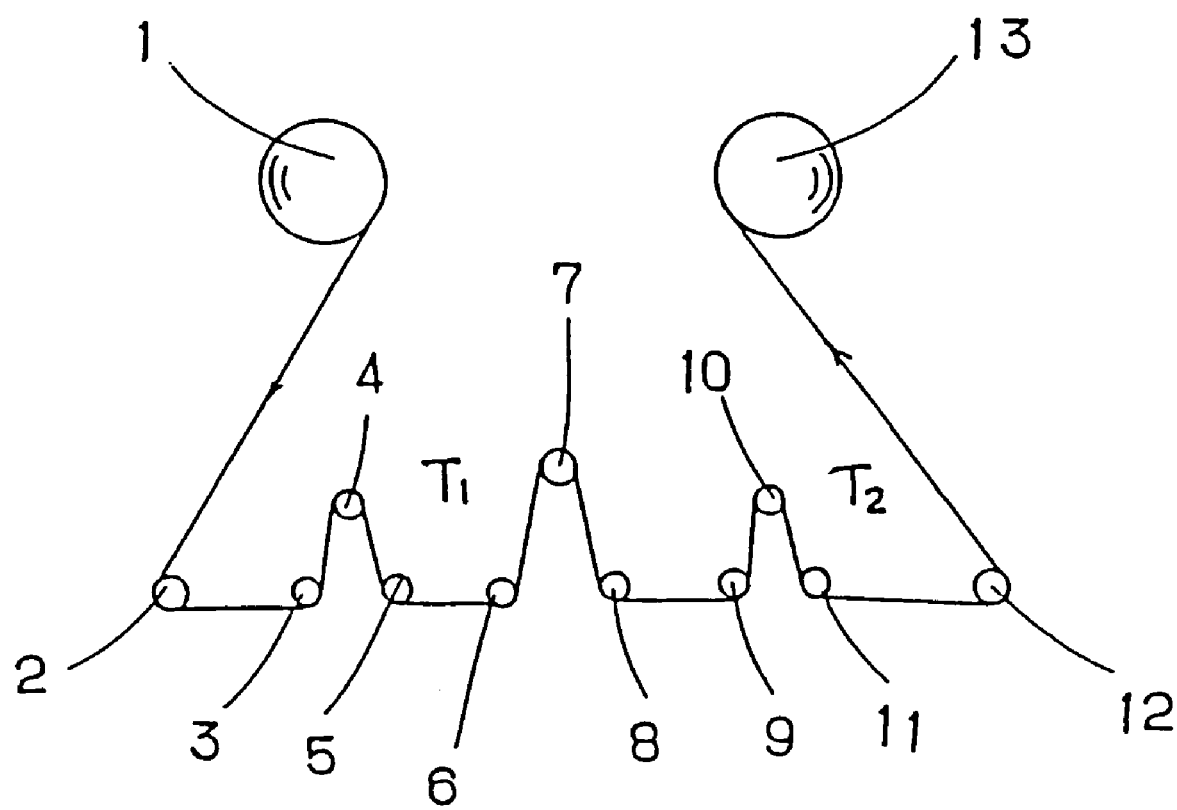
FIG. 1 is an illustration showing an apparatus for evaluating the wear resistance of a film.

An inorganic compound of the first invention features an agglomerate of fine primary particles which has voids and of which the particles have diameters set optionally in a specified range and uniform particle sizes and portions of the agglomerate are broken depending on the stress applied.

That is, in the case the agglomerate of the present invention is added to a resin, owing to the existence of the voids, the number of the projections of the surface roughness of a resin film or sheet can be increased as compared with that in the case of adding void-free one in the same weight and same addition ratio and also, since the agglomerate has a prescribed particle size and particle size distribution, even when it receives a specified stress by kneading it with an externally added resin or drawing it with the resin, it has sufficient strength to stand for that and does not cause cracking or deformation and accordingly the agglomerate is capable of providing projections with a desired size and further portions of fine particles in the particle surfaces are broken following the drawing, so that formation of voids between the resin and a filler can be suppressed.

The average particle size $dp_{50}$ of the agglomerate of the present invention is in a range of $0.5 \leq dp_{50} \leq 20$ [μm], preferably $1.0 \leq dp_{50} \leq 10$[μm], and further preferably $1.5 \leq dp_{50} \leq 5.0$[μm]. When the particle diameter $dp_{50}$ of the agglomerate is less than 0.5 μm, although it depends on the set film thickness of a film and a sheet to which the agglomerate is added, it would be impossible to form proper projections in the surface of the film or sheet and thus provides the anti-blocking property and slipping property without deteriorating the necessitated physical properties such as haze, transparency, and electric.

When the particle diameter $dp_{50}$ exceeds 20 μm, although it depends of the film thickness of a film and a sheet to which the agglomerate is added, the agglomerate deteriorates the appearance of the film and the sheet and in the case the film or the sheet is used for a base film of a magnetic recording medium or a capacitor, it is probable to cause problems such as dissociation of particles attributed to contact with a guide or electric insulation failure and to decrease the product value.

The agglomerate of the present invention has a sharp particle size distribution and as the index α of the sharpness, as shown by the following expression the value calculated by dividing the difference between the particle diameter $d_{90}$ of cumulative 90% minus sieve particles of the agglomerate and the particle diameter $d_{10}$ of cumulative 10% minus sieve particles of the agglomerate measured by a commercialized particle size distribution measurement apparatus by the average particle diameter $dp_{50}$ can be exemplified: $\alpha = (d_{90} - d_{10})/dp_{50}$.

The sharpness α of the agglomerate of the present invention forming an additive for resins is preferably in a range of $0 \leq \alpha \leq 2.5$ [−].

When α exceeds 2.5, since the agglomerate contains many unnecessary fine particles and coarse particles and when it is added to a film or sheet, it cannot provide proper roughness to the surface without deteriorating other physical properties such as the toughness, light transmission property or the like. It is noted that α is impossible to be less than zero.

It is noted that the particle size distribution of an agglomerate of the present invention was measured by Mirotrac-FRA, a laser analysis type particle size distribution measurement apparatus manufactured by Leeds & Northrup.

A solvent to be used for the measurement by the apparatus may be properly selected from water, methanol, ethanol, ethylene glycol and the like, but methanol is preferable in the present invention. As the pretreatment, ultrasonic dispersion is carried out by using MODEL US-300T, an ultrasonic dispersion apparatus manufactured by Nippon Seiki Co., Ltd., under condition of 300 μA for 100 seconds and then the measurement is performed.

The BET specific surface area Sw of the agglomerate of the present invention satisfies $30 \leq Sw$ [m²/g].

When the BET specific surface area Sw of the agglomerate is less than 30 m²/g, the surface energy of the particles themselves becomes small and therefore the particles are easily dispersed to make it difficult to form a desired agglomerate.

It is noted that there is no upper limit of the BET specific surface area Sw of the agglomerate of the present invention, however, when Sw exceeds 350 m²/g, the surface energy of the primary particles becomes so high and the cohesion among the primary particles becomes high and when a film is produced by drawing a resin mixed with an agglomerate of such particles of the present invention, the primary particles in the surface of the agglomerate would not be broken occasionally following the drawing and form voids.

It is noted that the BET specific surface area Sw of the agglomerate considerably affects the cohesion among the primary particles forming the agglomerate and its proper condition depends on the types of resins to be used, the grades such as melt flow index or the like, and film production conditions such as the kneading strength, the drawing times, or the like. Accordingly it is optionally selected taking them into consideration.

The tensile strength St required for breaking the agglomerate with the particle diameter 4 μm of the present invention is in a range of $20 \leq St \leq 150$[MPa], preferably $30 \leq St \leq 100$ [MPa], and further preferably $40 \leq St \leq 80$[MPa].

When the tensile strength St of the agglomerate is less than 20 MPa, if a film or sheet is produced from a resin mixed with the agglomerate, the agglomerate is broken up by kneading and drawing steps in the production process and not only fails to form effective projections in the film surface but also deteriorates the transparency of the film or sheet in the case the breaking occurs to a far extent.

When the tensile strength St of the agglomerate exceeds 150 MPa, since the following of a resin at the time of drawing of a film becomes poor, it results in averse effects to the prevention of void formation, and accordingly, that is not preferable.

The tensile strength Sta required to break 30% of the particle diameter of the agglomerate with the same particle diameter 4 μm is in a range of $200 \leq Sta \leq 600$[MPa], preferably $300 \leq Sta \leq 500$[MPa].

When the tensile strength Sta is less than 200 MPa, the agglomerate breaking by the kneading and drawing steps in the production process takes place to so far extent in the case of producing a film or sheet from a resin containing the agglomerate and the agglomerate cannot form effective projections in the film surface and may possibly deteriorate the transparency of the film or sheet.

When the tensile strength Sta exceeds 600 MPa, the agglomerate behaves as a single particle and when a film or sheet containing the agglomerate is drawn, void formation, particle dissociation, and scratches attributed to the agglomerate added occur, and therefore, that is not preferable.

The tensile strength St and Sta of the agglomerate with the particle diameter 4 μm were measured by micro compression testing machine MCT-W500-J manufactured by Shimadzu Corporation and the measurement was made under conditions of 9.8 mN in load and 0.892405 mN/sec. in load speed. St and Sta are measured by the following manner;

First, 100 pieces of the agglomerates are selected and the breaking test is made until 70% of the agglomerates is broken and measured values at the time of breaking and 30% breaking of the agglomerates are obtained. Next, 10 pieces of the agglomerates are removed from the maximum value and the minimum value, respectively. With respect to the rest 80 pieces of the agglomerates, the particle diameters are plotted on the axis of abscissa, the measured values are plotted on the axis of ordinate and the approximate straight line obtained by the method of least squares are plotted respectively. From the approximate straight line, the values corresponding to 4 μm are induced in terms of St and Sta, respectively.

As a preferable embodiment, the solidified apparent density $\rho bp$ of the agglomerate of the present invention is in a range of $0.2 \leq \rho bp \leq 0.8 [g/cm^3]$, preferably $0.3 \leq \rho bp \leq 0.7 [g/cm^3]$, and further preferably $0.4 \leq \rho bp \leq 0.6 [g/cm^3]$.

The anti-blocking property and slipping property of a film or sheet are fluctuated depending on the height and the number of the projections in the surface of the film or sheet which are produced by the particles added. Since the number of the surface projections is a function of the number of the particles, when the addition amounts are same by the weight ratio, the projection number changes depending on the size of the voids in the particles.

The present inventors found that the solidified apparent density is suitable for understanding the voids existing in the respective particles in entire powder and that when agglomerate has a specified solidified apparent density or higher, the agglomerate can provide a large number of projections in the case it is added to a film or sheet.

When the solidified apparent density $\rho bp$ exceeds 0.8 g/cm$^3$, the specific gravity per one agglomerate particle becomes high and the number of the particles to be added in a film tends to be decreased. When the solidified apparent density $\rho bp$ is less than 0.2 g/cm$^3$, it is sometimes difficult to admix with a resin when blended thereinto.

In the present invention, the solidified apparent density $\rho bp$ can be measured by a powder tester manufactured by Hosokawa Micron Co., Ltd. based on the Carr Theory.

The agglomerate of an inorganic compound of the present invention does not have any problem if it is formed by agglomerating fine primary particles and satisfies the above-mentioned requirements, but the particle diameter dx of the primary particles is preferably in a range of $0.005 < dx < 0.10$ [μm].

When the particle diameter dx of the primary particles forming the agglomerate exceeds 0.10 μm, the surface energy of the primary particles becomes small and therefore the particles are easily dispersed to make it difficult to form a desired agglomerate.

Even when they are agglomerated only apparently, since the binding force among the primary particles forming the agglomerate is weak, they are separately dispersed by kneading and drawing steps in the production process of a resin film or the like and consequently fail to form sufficient roughness in the film surface, which is one aim of the present invention and therefore cannot provide the anti-blocking property and slipping property, occasionally.

On the contrary, when the particle diameter dx of the primary particles of the agglomerate is less than 0.005 μm, the surface energy of the primary particles becomes so high, the cohesion among the primary particles is high and in the case a film is produced by drawing a resin mixed with the agglomerate of the present invention, the primary particles in the surface of the agglomerate are not broken following the drawing and form voids, occasionally.

It is noted that the particle diameter dx of the primary particles can be measured by selecting scanning type electron microscopic or transmission microscopic views by a digitizer and the shapes of the particles observed by the foregoing microscope vary to be spherical, cubic, fibrous, rod-like, amorphous and the like. Although it is supposed to be better that the shapes of the primary particles are uniform, even when primary particles in various shapes are mixed, the effects of the present invention are not changed.

As a preferable embodiment, the agglomerate of the present invention may be surface-treated with at least one kind selected from aliphatic acids, alicyclic carboxylic acids, aromatic carboxylic acids, their sulfonic acids and resin acids, their metal salts, ammonium salts, amine salts, esters; coupling agents; silicone oils; paraffin; copolymers of $\alpha,\beta$-monoethylenically unsaturated carboxylic acids and monomers copolymerizable with $\alpha,\beta$-monoethylenically unsaturated carboxylic acids, their metal salts, ammonium salts, amine salts, esters; various phosphoric acid esters; and commercialized industrial soaps.

With respect to the above-mentioned surface treatment, in terms of particle stability, physical properties such as dispersibility or the like, applications, effects on the environments, the handling easiness and the cost, aliphatic acids; alkali metal salts and ammonium salts of the aliphatic acids; and phosphoric acid esters are preferable for polyolefin resins, for example, a biaxially drawn polypropylene film and among them, aliphatic acids are especially preferable for the surface treatment.

Further, for polyester resins, for example, a biaxially drawn polyethylene terephthalate film, polyacrylic acid, ammonium salts of copolymers of $\alpha,\beta$-monoethylenically unsaturated carboxylic acids and copolymerizable monomers, and phosphoric acid esters are preferably used and surface treatment with both phosphoric acid esters and ammonium salts of copolymers of $\alpha,\beta$-monoethylenically unsaturated carboxylic acids and copolymerizable monomers is especially preferable.

Examples of the aliphatic acids, alicyclic carboxylic acids, aromatic carboxylic acids, and resin acids include: saturated aliphatic acids such as caproic acid, caprylic acid, lauric acid, myristic acid, palmitic acid, stearic acid, arachidinic acid, behenic acid, lignoceric acid and the like; unsaturated aliphatic acids such as sorbic acid, elaidic acid, palmitoleic acid, oleic acid, linoleic acid, erucic acid, ricinolic acid, and the like; aromatic carboxylic acid such as alicyclic carboxylic acids, e.g., naphthenic acids having cylcopentane ring and cyclohexane ring, benzenecarboxylic acids such as benzoic acid, phthalic acid and the like, naphthalene carboxylic acids such as naphthoic acid, naphtalic acid and the like; and resin acids such as abietic acid, pimaric acid, palastrinic acid, neoabietic acid, and the like, and among them, stearic acid or lauric acid is preferable to be used in terms of reactivity with the inorganic compound forming the agglomerate, the particle stability, and the dispersion-providing cap ability.

Examples of the metal salts; amine salts and ammonium salts of the aliphatic acids, alicyclic carboxylic acids, aromatic carboxylic acids, and resin acids include: saturated aliphatic acid salts such as potassium laurate, potassium myristate, palmitic acid potassium salt, sodium salt, stearic acid salts with barium, calcium, zinc, potassium, cobalt(II), tin(IV), sodium, lead(II), and the like; unsaturated aliphatic acid salts such as oleic acid salts with zinc, potassium, cobalt(II), sodium, potassium diethanol amine, and the like; alicyclic carboxylic acid salts such as lead naphthate, lead cyclohexylbutyrate, and the like; and aromatic carboxylic acid salts such as sodium benzoate, sodium salicylate and the like.

At the time of the surface treatment of the agglomerate of the present invention or before the treatment, metal salts and amine salts of the aliphatic acids, alicyclic carboxylic acids, aromatic carboxylic acids, and resin acids may be properly produced by mixing and reacting compounds containing lithium, sodium, potassium rubidium, beryllium, magnesium, calcium, strontium, barium, zinc, aluminum, lead, cobalt, tin, and acyl with the above-mentioned aliphatic acids, alicyclic carboxylic acids, aromatic carboxylic acids, and resin acids.

Among the above-mentioned metal salts, ammonium salts and amine salts of the aliphatic acids, alicyclic carboxylic acids, aromatic carboxylic acids, and resin acids, potassium myristate or potassium laurate is preferable to be used in terms of the reactivity with the inorganic compound forming the agglomerate, the particle stability, and the dispersion-providing capability.

As the commercialized industrial soaps containing various types of aliphatic acid metal salts, Marseille soap, palm oil soap, coconut oil soap and the like may be selected depending on the inorganic compound forming the agglomerate and in terms of the cost other than any other factors, they are most effective among the treatment agents and Marceille soap is especially preferable.

Examples of the esters of the aliphatic acids, alicyclic carboxylic acids, aromatic carboxylic acids, and resin acids include: saturated aliphatic acid esters such as capronic acid ethyl and vinyl esters, diisopropyl adipate, ethyl caprylate, capric acid allyl, ethyl, and vinyl esters, sebacic acid diethyl and diisopropyl esters, cetyl isooctanate, octyldodecyl dimethyloctanate, lauric acid methyl, butyl, and lauryl esters, myristic acid methyl, isopropyl, cetyl, myristyl, isocetyl, octyldodecyl, and isotridecyl esters, palmitic acid methyl, isopropyl, cetyl, isostearyl esters, stearic acid methyl, butyl, octyl, stearyl, and cholesteryl esters, isocetyl isostearate, behenic acid methyl and behenyl esters; unsaturated aliphatic acid esters such as methyl oleate, linoleic acid ethyl and isopropyl esters, ethyl oliveoleate, methyl erucate; and further, long chain aliphatic acid higher alcohol esters; neopentylpolyol-(long chain and middle chain)aliphatic acid type esters and partially esterified compounds; dipentaerythritol-long chain aliphatic acid esters; complex middle chain aliphatic acid esters; 12-stearoylstearic acid isocetyl, isostearyl, and stearyl esters; beef tallow aliphatic acid octyl ester; heat resistant special aliphatic acid esters such as polyhydric alcohol aliphatic acid esters/aliphatic acid esters of alkylglyceryl ethers; and aromatic esters such as benzoic acid esters, and among them, polyhydric alcohol aliphatic acid esters such as polyhydric alcohol stearic acid or palmitic acid ester, stearyl stearate, and sorbitan monooleate are preferable to be used in terms of the reactivity with the inorganic compound forming the agglomerate, the particle stability, and the dispersion-providing capability.

Examples of the aliphatic, alicyclic and aromatic sulfonic acids include: sulfonic acids such as sulfosuccinic acid, dioctylsulfosuccinic acid, laurylsulfosuccinic acid, tetradecenesulfonic acid and the like; alkylsulfuric acids comprising alkyl group such as lauryl, myristyl, palmityl, stearyl, oleyl, cetyl and the like; polyoxyethylene alkyl ethereal sulfates such as polyoxyethylene(2) lauryl ethereal sulfate, polyoxyethylene(3) lauryl ethereal sulfate, polyoxyethylene(4) lauryl ethereal sulfate, polyoxyethylene(3) alkyl ethereal sulfate, polyoxyethylene(4) nonylphenyl ethereal sulfate, and the like; and aromatic sulfonic acids such as straight chain $(C_{10}, C_{12}, C_{14})$alkylbenzenesulfonic acids, branched alkylbenzenesulfonic acids, naphthalenesulfonic acid, dodecylbenzenesulfonic acid and the like, and among them, dodecylbenzensulfonic acid is preferable to be used in terms of the reactivity with the inorganic compound forming the agglomerate, the particle stability, and the dispersion-providing capability.

As the metal salts of the aliphatic, alicyclic and aromatic sulfonic acids, sodium salts of the aliphatic, alicyclic and aromatic sulfonic acids are common and at the time of surface treatment of the surface treatment of the agglomerate of the present invention or before the treatment, metal salts of aliphatic, alicyclic, and aromatic compounds may be properly produced by mixing and reacting compounds containing lithium, sodium, potassium, rubidium, beryllium, magnesium, calcium, strontium, barium, zinc, aluminum, lead, cobalt, tin, and various types of amines with the above-mentioned aliphatic, alicyclic, and aromatic sulfonic acids, and among them, sodium dodecylbenzenesulfonate is preferable to be used in terms of the reactivity with the inorganic compound forming the agglomerate, the particle stability, and the dispersion-providing capability.

Examples of the silane coupling agent include: γ-chloropropyltrimethoxysilane, vinyltriethoxysilane, vinyltrimethoxysilane, vinyltris(β-methoxyethoxy)silane, γ-methacryloxypropyltrimethoxysilane, β-(3,4-epoxycyclohexyl) ethyltrimethoxysilane, γ-glycidoxypropyltrimethoxysilane, γ-mercaptopropyltrimethoxysilane, γ-aminopropyltriethoxysilane, N-β-(aminoethyl)-γ-aminopropyltrimethoxysilane, γ-ureidopropyltriethoxysilane and the like, and vinyltrimethoxysilane and β-(3,4-epoxycyclohexyl)ethyltrimethoxysilane are preferable to be used in terms of the capability of providing hydrophobicity to the agglomerate.

Examples of the copolymers of α,β-monoethylenically unsaturated carboxylic acids and monomers copolymerizable with α,β-monoethylenically unsaturated carboxylic acids, their alkaline metal salts, ammonium salts, and amine salts include: acrylic acid, methacrylic acid, crotonic acid, maleic acid, itaconic acid, and their alkaline metal salts, ammonium salts, and amine salts; the copolymers of these α,β-monoethylenically unsaturated carboxylic acids and copolymerizable monomers and their alkaline metal salts, ammonium salts, and amine salts.

Examples of the monomers copolymerizable with α,β-monoethylenically unsaturated carboxylic acids include: acrylic acid alkyl esters and methacrylic acid alkyl esters; acrylates and methacrylates comprising alkoxy groups; acrylates and methacrylates comprising cyclohexyl groups; α,β-monoethylenically hydroxyesters; polyoxyalkyleneglycol monoacrylate and monomethacrylate; vinylesters; vinyl aromatic compounds; unsaturated nitriles; unsaturated dicarboxylic acid esters; vinyl ethers; conjugated dienes; chain olefins; and cyclic olefins.

Among them, copolymers of acrylic acid and polyethyleneglycol monomethacrylate in which 60% of the total carboxylic acids are neutralized with sodium ion and copolymers of acrylic acid and butyl methacrylate in which 20% of the total carboxylic acids are neutralized with ammonium ion are preferable.

Examples of the phosphoric acid esters include: trimethyl phosphate, triethyl phosphate, tributyl phosphate, 2-ethylhexyl phosphate, butoxyethyl phosphate, triphenyl phosphate, tricresyl phosphate, trixylenyl phosphate, cresyl diphenyl phosphate, 2-ethylhexyl diphenyl phosphate, cresyl di-2,6-xylenol phosphate, resorcinol diphenol phosphate, phosphoric acid esters with various aromatic condensates, 2-chloroethyl, chloropropyl phosphate, dichloropropyl phosphate, tribromoneopentyl phosphate, halogen-containing phosphoric acid condensates, bis-2-ethylhexyl phosphate, diisodecyl phosphate, 2-methacryloyloxyethyl acid phosphate, diphenyl-2-methacryloyloxyethyl phosphate, methyl acid phosphate, butyl acid phosphate, dibutyl phosphate, monobutyl phosphate, 2-butylhexyl acid phosphate, isodecyl acid phosphate, monoisodecyl phosphate, triphenyl phosphate, dibutylhydrodiene phosphite, dibutylhydrodiene phosphite, diphenyl phosphorochloridate, phenyl phosphorochloridate, polyoxyethylene lauryl ether phosphoric acid, 12 to 15 alkyl groups-containing polyoxyalkyl ether phosphoric acids, 12 to 15 alkyl groups-containing polyoxyethylenealkyl phenyl ether phosphate, and 12 to 15 alkyl groups-containing polyoxyethylenedialkyl phenyl ether phosphate, and among them, in the case of using the esters for polyolefins of such as biaxially drawn polypropylene films, 2-ethylhexyl phosphate and tricresyl phosphate are preferable and in the case of using the esters for polyesters such as diaxially drawn polyethylene terephthalate, trimethyl phosphate and triethyl phosphate are preferable.

The amount of the above-mentioned surface treatment agents to be used is properly selected depending on the types and the applications of the resins for which the agglomerate obtained by the present invention is used and for example, in the case of adding such an agent to a resin film, it is 0.5 to 20 wt. %, preferably 1.0 to 15 wt. %, and more preferably 2.0 to 10 wt. % to the agglomerates.

When the amount of a surface treatment agent to be used is less than 0.5 wt. %, no effect of the surface treatment agent is confirmed and addition results in only deterioration of the handling property and cost up and therefore it is not preferable.

When the amount of a surface treatment agent to be used exceeds 20 wt. %, in the case of adding the agent to a resin film, the addition may change the reactivity at the time of polymerization reaction and the viscosity of the resin at the time of kneading the resin or may cause problems such as deterioration of the transparency of a film to be produced and therefore it is not preferable.

The inorganic compound forming the agglomerate of the invention is preferable to satisfy the following characteristics that the primary particles can be formed by three-dimensional agglomeration and, accordingly, a high solidified apparent density can be obtained; that bonding of the primary particles to one another and the bonding force are controllable; that the particle diameter of the agglomerate can be selected optionally and the particle size of the agglomerate is relatively uniform; and that the crystal water on the surface of the particles and the components to be evaporated are as slight as possible.

Examples of the inorganic compound satisfying the above-mentioned conditions include calcium phosphate, barium sulfate, calcium carbonate, calcium sulfate and the like, and among them, from the aspects of the availability of the raw materials, the production cost, the safety, and the option of the designs, calcium carbonate is preferably selected.

In the case calcium carbonate is selected in the present invention, needless to mention calcium carbonate surface-treated with the above-mentioned various surface treatment agents, it may include those with particle surface modified with phosphoric acid, sulfuric acid, silica, alumina or the like to a certain extent in the direction from the surface to the center.

As a production method of the agglomerate comprising fine primary particles of an inorganic compound, any method may be employed when it is capable of producing the agglomerate satisfying the above-mentioned requirements and, for example, the particles may be produced by pulverizing natural minerals and adjusting the particle size by classification and for example, particles satisfying the requirements of the present invention can be obtained by adjusting the particle size by repeating the pulverization and classification of a natural calcium phosphate mineral and surface-treating the pulverized particles with the stearic acid and vinyltrimethoxysilane.

However, the above-mentioned method is a method completely ignoring the cost performance in such a manner that the method requiring steps of selectively cutting a portion of calcium phosphate mineral and repeating the pulverization and classification many times and, accordingly, it is impossible at all to industrially stably supply the particles.

Because of the above-mentioned reasons, the present inventors have made studies to find an agglomerate of fine primary particles of calcium carbonate that can be industrially stably supplied, produced at a low production cost, has options for physical properties and good safety properties and at the same time to find a production method of such an agglomerate.

Although being not particularly limited to the following method, one example of a production method of an agglomerate comprising calcium carbonate in the present invention will be described below.

A calcium hydroxide-water suspension containing 7 wt. % or more calcium hydroxide and having the suspension temperature of 3 to 25° C. is mixed with at least one kind of organic compounds (hereinafter, referred to as a chelating agent) which are coordinated with metal ion to form metal chelate compounds with polyligands and have equilibrium constant pKa with calcium ion in a range of 1 to 50 in an amount of 1.0 to 10 wt. % in that of the calcium carbonate to be produced theoretically and carbonic acid gas is supplied to the calcium hydroxide suspension at a rate not lower than 4 ml/min on the basis of pure carbonic acid gas per 1 g of calcium hydroxide under normal pressure and when the pH becomes in a range of 6.2 to 8.3, the reaction is finished.

The concentration of calcium hydroxide in a calcium hydroxide suspension needed to obtain the agglomerate of calcium carbonate of the present invention is 7 wt. % or higher, preferably 8.6 wt. % or higher, and further preferably 10.2 wt. % or higher.

When the concentration of calcium hydroxide is less than 7 wt. %, although the agglomerate obtained by the reaction has large primary particles, it becomes small in the form of the agglomerate and therefore a desired particle diameter in the form of the agglomerate cannot be obtained occasionally.

Incidentally, as the concentration of calcium hydroxide becomes high, the obtained agglomerate tends to have sharp particle size distribution.

The liquid temperature of the calcium hydroxide suspension required to obtain the calcium carbonate agglomerate of the present invention is in a range of 3 to 30° C., preferably 5 to 25° C., and more preferably 10 to 20° C.

According to the study by the present inventors, it is made clear that when the liquid temperature becomes low, the agglomerate tens to be small in BET specific surface area, i.e., in primary particle size, while as the liquid temperature becomes high, the counter phenomenon tends to occur.

When the liquid temperature of the calcium hydroxide suspension exceeds 30° C., the primary particles obtained after the reaction have needle-like or column-like shape and they are relatively dispersed to make production of the agglomerate of the invention impossible occasionally.

The reason for that is not clear, however, it is presumably considered that in the case of obtaining the agglomerate of the present invention, the high solubility of calcium hydroxide or carbonic acid in water is increased and the reaction is promoted fast.

It is noted that when the liquid temperature of the calcium hydroxide suspension is less than 3° C., the cost for cooling is high but the effect of the reaction is slight.

It is indispensable to add one or more types of chelating agents with 1 to 50 of a reaction stabilizing constant pKa to the calcium ion to the calcium hydroxide-water suspension. Examples of the chelating agents may include aliphatic carboxylic acids such as oxalic acid, maleic acid, tricarballylic acid and the like; oxycarboxylic acids or ketocarboxylic acids such as glycollic acid, citric acid, tartaric acid, malic acid, pyruvic acid and the like; thiocarboxylic acids such as thioglycollic acid and the like; aromatic carboxylic acid or aromatic aldehydes such as trimellitic acid, pyromellitic acid, salicylaldehyde and the like; condensate phosphoric acids such as hexametaphosphoric acid, pyrophosphoric acid, tripolyphosphoric acid, polyphosphoric acid, ultraphosphoric acid and the like; aromatic sulfonic acids such as chromotropic acid, tiron and the like; aminopolycarboxylic acids such as iminodiacetic acid, nitrilotriacetic acid, ethylenediaminediacetic acid, hydroxyethylethylenediaminetriacetic acid, ethylenediaminetetraacetic acid; amino acids or protein such as glutamic acid, aspartic acid, albumin, gelatin, carboxypeptitase and the like; purin bases and nucleotides such as purin, flavin mononucleotide, and the like; antibiotics such as penicillin and the like; metal colorimetric indicators such as Eriochrome Black and the like; oximes or ketones such as dimethylglyoxime, methyloxime, acetyl acetone and the like; amines such as triethanolamine, hydroxyethylamine and the like and their sodium and potassium salts.

Among them, oxycarboxylic acids, aminopolycarboxylic acids, and their sodium and potassium salts with a reaction equilibrium constant pKa within 2 to 12 such as citric acid, malic acid, nitrilotriacetic acid, hydroxyethyldiacetic acid and their sodium and potassium salts are preferable to be used and citric acid and malic acid are especially preferable in terms of the options of the BET specific surface area, the availability and the cost.

When the reaction stabilizing constant pKa of a chelating agent to calcium ion is less than 1 or no chelating agent is added, no particle with a BET specific surface area, a particle size and a particle strength required for the present invention can be obtained occasionally. No chelating agent with pKa exceeding 50 to calcium ion can be found. The above-mentioned reaction stabilizing constant pKa of a chelating agent to calcium ion is a value at pH 7.0.

The above-mentioned chelating agent may be optionally selected depending on the kind, use and the purpose of use of a resin to be blended with, according to the study by the present inventors, when citric acid or malic acid is used, the agglomerate in a range of 0.5 to 10 μm and in a range of 40 to 150 m$^2$/g in BET specific surface area tends to be obtained, while nitrilotriacetic acid or hydroxyethyl iminodiacetate is used, the agglomerate in a range of 5 to 20 μm and in a range of 40 to 150 m$^2$/g in BET specific surface area tends to be obtained.

The addition amount of a chelating agent to be added to the calcium hydroxide-water suspension is 1.0 to 10 wt. % in the calcium carbonate to be produced.

The addition amount may be properly selected depending on the BET specific surface area, the particle size, the solidified apparent density, the intensity of the cohesion among primary particles, and the types of chelating agents to be added, and it may be varied by the kind of the chelating agent, but as it becomes large, the agglomerate tends to have large BET specific surface area, i.e., particles tend to become small. When the addition amount is less than 1.0 wt. %, no effect of chelating agent addition is exhibited and that is not preferable.

Further, even when the addition amount exceeds 10 wt. %, the effect does not significantly differ from that in the case of 10 wt % addition and it is disadvantageous in the cost and further troubles in the next steps and adverse effects on products are expected and therefore that is not preferable.

Carbonic acid gas is blown to a chelating agent-mixed calcium hydroxide suspension at 4 ml/min. or higher on the basis of pure component, preferably 6 ml/min. or higher, and further preferably 10 ml/min. per 1 g of calcium hydroxide in the suspension under a normal pressure and when pH becomes in a range of 6.2 to 8.3, the reaction is finished.

Carbonic acid gas, which is one raw material of calcium carbonate, is supplied in the form of a gas, however in the case of reaction with calcium ion in the reaction system, it is required for the gas to be dissolved in water and converted into carbonate ion. Additionally, in the case of obtaining an agglomerate of calcium carbonate of the present invention, it is found that supply of carbonate ion to the reaction system has to be performed extremely quickly.

As a method for supplying carbonic acid gas quickly while converting the gas into carbonate ion, there are manners of increasing the carbonic acid gas concentration and flow rate; making the bubbles of carbonic acid gas small; stirring the calcium hydroxide suspension as well; and the like. The stirring may be carried out simply by using stirring blades or by a manner of utilizing the refluxing current caused by the carbonic acid gas or causing suspension current from the bottom part to the upper part (allowable to be reverse) in a reaction tank by a pump or the like.

When the flow rate at less than 4 ml/min. on the basis of pure component of carbonic acid gas, no agglomerate of the invention can be obtained even when stirring is carried out. Additionally, sodium carbonate, sodium hydrogen carbonate, potassium carbonate, ammonium carbonate, ammonium hydrogen carbonate, urea carbonic acid salt soluble in water and the like may be used in place of the carbonic acid gas, however they are not superior to carbonic acid gas in terms of the cost or because they require pairing ion removal and its treatment in the successive steps.

Incidentally, the supply amount of carbonic acid gas is varied depending on the kind of a chelating agent, but according to the study by the present inventors, as it becomes large, the agglomerate tends to become large in particle diameter.

In the reaction of obtaining calcium carbonate agglomerate of the present invention, the completion point of the reaction is at pH 6.2 to 8.3.

When the completion point of the reaction is set at pH around 8.3, the voids in the obtained agglomerate become large, however calcium carbonate tends to be dissolved in the solution and reprecipitated on the particle surface during the production to result in growth and dispersion of the primary particles. On the other hand, when the pH is set around 6.2, the stability is increased during the production process, however the voids are lowered. Therefore, the pH of the reaction completion should be determined in consideration of the production conditions and the physical properties of the particles designed to obtain.

Incidentally, it is not preferable to set pH exceeding 8.3 since the probability of growth and dispersion of the primary particles is increased during the production process and on the contrary, it is difficult to adjust pH to be less than 6.2 at the termination of reaction.

For the purpose of adjusting the particle diameter of the agglomerate of calcium carbonate that is one characteristic of the present invention, the following steps may be performed to the extent that the the present invention is not affected: during the reaction, water or a chelating agent may be added, or supply of carbonic acid gas is stopped during the carbonation or the supply amount is decreased and thereafter, water or a chelating agent is added to the suspension and carbonic acid gas is again supplied to complete the reaction.

The stoppage of the supply of carbonic acid gas or supply decrease as well as the addition of water or a chelating agent is preferable to be carried out from the time the viscosity of the suspension reaches highest by the supply of carbonic acid gas to the chelating agent-mixed calcium hydroxide suspension to the time pH of the system reaches 11.0.

As a preferable embodiment, in the case of obtaining surface-treated agglomerate, it can be obtained by carrying out surface treatment by the usual method for the agglomerate obtained by the above-mentioned reaction and when the treatment agent is water-soluble, the surface treatment can be carried out by directly adding the agent to the suspension of calcium carbonate and stirring the suspension. When the dissolution temperature of the treatment agent is at a room temperature or higher, the agent is better to be dissolved in hot water or the like to obtain a solution and at the same time it is preferable to keep the suspension of the agglomerate at the same temperature.

Further, using Henshel mixer, a treatment agent in a solution state may be used for a dry powder of the agglomerate or a surface treatment agent in a dry powder state may be used for dry treatment.

The surface agent to be treated and the treatment amount of the agent are already described and they may be properly selected depending on the types of resins and films to be used.

The agglomerate production method of the agglomerate comprising calcium carbonate in the present invention involves common drying and pulverizing steps after the reaction or surface treatment and may involve a step of dewatering before the drying by filter press or centrifugal separation.

When drying is carried out by an instantaneous drying apparatus or a freeze drying apparatus such as a spray dryer, a fluidized bed drying apparatus and the like without the dewatering, a preferable agglomerate with a high BET specific surface area and desirable voids can be obtained, however the cost becomes high. On the contrary, when water is removed by the above-mentioned dewatering, the drying cost can be saved and when water is removed to an excess extent, particles with a low porosity are easy to be formed.

Accordingly, the press and drying conditions are also determined in consideration of the required physical properties and cost.

For the purpose to form larger agglomerate (flocks) in the suspension of the agglomerate obtained by the present invention, the production method may be carried out by adding one or more binder components selected from the following: sugar, dextrose, corn syrup, gelatin, glue, starch, casein, carboxymethyl celluloses, polyvinyl alcohol, glycol, polyethylene glycol, alcohols, polyethylene oxides, copolymers of $\alpha,\beta$-monoethylenically unsaturated carboxylic acids and monomers copolymerizable with $\alpha,\beta$-monoethylenically unsaturated carboxylic acids, their metal salts, ammonium salts, amine salts, latex, tar, pitch, alumina sol, silica sol, silica gel, water glass (sodium orthosilicate, sodium metasilicate), finely powdered silica, porous silica, magnesium chloride, aluminum sulfate, aluminum chloride, sodium aluminate, magnesium sulfate, gum arabic, sodium alginate.

The particles obtained by the above-mentioned method seemingly have different particle size in the suspension or in dry powder state from that of the agglomerate of the present invention. However, it is confirmed that the flocs of them are easily broken up by mixing with a resin before kneading and thus they behave in the practically same manner as the agglomerate of the present invention.

A resin to be used for a resin composition, which is the second invention, containing the agglomerate obtained by the present invention is not particularly limited and the following resins can be exemplified: examples of thermoplastic resins are polyolefins such as polyethylene, polypropylene and the like, polystyrene, polyvinyl acetate, polyacrylic acid esters, polyacrylic acid amide, polyesters, polyacrylonitrile, polyamides, polyvinyl chloride, polyvinylidene chloride, polyphenylene sulfide and the like: examples of themosetting resins are phenol resins, epoxy resins, unsaturated polyester resins, alkid resins, urea resins, melamine resins, urethane resins, silicone resins, and biodegradable resins such as polylactic acid which are in the spotlight as recent innovative resins, and among them, polyolefin resin, polyester reins, polyamide resins, polyvinyl chloride resins, and biodegradable resins are preferable for films and sheets and especially useful for their drawn films and sheets. Those may be used singly or, if necessary, in combination of two or more.

As the polyolefin resins, any can be used without limitation if it is transparent and crystalline and self-supporting film-formability and crystalline homopolymers of $C_{2-12}$ $\alpha$-olefins or copolymers of 2 kinds or more of them can be exemplified.

Practically, for example, polyethylene, polypropylene, poly-4-methylpentene-1, ethylene-propylene random or block copolymers, ethylene-propylene-butene copolymers, ethylene-propylene-hexene copolymers and the like can be exemplified, and among them, polypropylene and polymers containing at least 50 wt. % of propylene and other a-olefins are preferable, and especially propylene polymers containing 0 to 6 wt. % of ethylene are further preferable.

The polyolefin resins usable are those which are crystalline and have an isotactic index (II) generally 40 or higher, preferably 60 or higher, and further preferably 90 or higher. Further, they are limited to those which are formable and have melt flow rate (MFR) in a range generally 0.01 to 100 g/min., preferably 0.1 to 50 g/min., and further preferably 0.1 to 10 g/min.

As the polyester resins, any can be used without limitation when it is polyester resin mainly comprising an aromatic dicarboxylic acid and an aliphatic glycol and such an unsaturated polyester resin is practically linear and has film-formability by fusion at the time of film formation.

Examples of the aromatic dicarboxylic acid may include terephthalic acid, naphthalenedicarboxylic acid, isophthalic acid, diphenyl ether dicarboxylic acid, diphenylsulfonedicarboxylic acid, diphenyl ketone dicarboxylic acid, anthracenedicarboxylic acid and the aliphatic glycol may include, for example, $C_{2-10}$ polymethylene glycol such as ethylene glycol, trimethylene glycol, tetramethylene glycol, pentamethylene glycol, hexamethylene glycol, decamethylene glycol and the like and alicyclic diols such as cyclohexanedimethanol and the like.

As the polyester resin to be used preferably for the invention, those comprising alkylene terephthalate and/or alkylene naphthalate as main constituent components can be exemplified and among them, polyethylene terephthalate, polyethylene-2,6-naphthalate, copolymers comprising aromatic dicarboxylic acid components of which at least 80% are terephthalic acid and/or 2,6-naphthalenedicarboxylic acid and glycol components of which at least 80% are ethylene glycol are especially preferable.

The ratio of the agglomerate of the present invention to be added to a resin for obtaining a resin composition of the present invention may be properly selected depending on the types and the uses of the resin and for example, in the case the agglomerate is added to a synthetic resin film, the ratio is 0.01 to 5 parts by weight, preferably 0.05 to 3 parts by weight to 100 parts by weight of the resin.

When the addition ratio of the agglomerate of the present invention is less than 0.01 parts by weight, it becomes difficult to form proper roughness in the surface of the resin to which the agglomerate is added and accordingly to result in impossibility of providing the desired sufficient anti-blocking property and slipping property, and it is not preferable.

When the addition ratio of the agglomerate of the invention exceeds 5 parts by weight, in the case of adding resin films, the transparency, the toughness and the drawing property of the films are adversely deteriorated, and it is not preferable.

The agglomerate of the invention is added in an attempt to provide the anti-blocking property and the slipping property to the resins to which the agglomerate is added and effects are significantly exhibited for the uses just like films and sheets of synthetic resins in which slipping property is very important for the production process and at the use and the effects are exhibited to the maximum extent in the case of biaxially drawn films.

An addition method of the agglomerate of the present invention to a resin is not particularly limited and a method by mixing the agglomerate with the resin by a kneader or a method for adding a resin additive of the present invention by mixing and dispersing the agglomerate in ethylene glycol, which is one raw material of polyethylene terephthalate and polymerizing the resulting ethylene glycol with terephthalic acid can be employed.

Other components to be added to the resin composition of the present invention are not particularly limited and, if necessary, a blocking-preventive agent with another composition, for example, synthetic spherical silica and silica gel; α-,γ-alumina, aluminum silicate, synthetic zeolites, titanium oxide, kaolin, clay, talc, barium sulfate, agglomerates other than the resin additive of the present invention, calcium carbonate other than the agglomerate of the present invention, calcium phosphate compounds such as ACP, FAP, OCP, TCP, DCP, DCPD and the like can be added solely or in combination of two or more of them to the extent that they do not hinder the effects of the present invention.

Further, one or more of the additives selected from other additives to be used for resins such as polyolefins and polyesters may be added on the bases of the use to the extent that they do not hinder the effects of the present invention and examples of them are pigments, dyes, UV absorbents, various stabilizers, anti-oxidants, light-shielding agents, processing assisting agents, antistatic agents, anti-bacterial agents, deodorants, agricultural chemicals, perfumes and the like.

Hereinafter the present invention will be described in detail with reference to examples and comparative examples, however, the present invention is not at all limited thereto.

Meanwhile, in the following description, as a solvent for measurement of particle size distribution, methanol was used.

Moreover, the abbreviations in the following Tables indicate the following substances:

NTA: nitrilotriacetic acid
HEDTA: hydroxyethylethylenediaminetriacetic acid
DBS: dodecylbenzenesulfonic acid
DBS-Na: sodium dodecylbenzenesulfonate
Marceille soap: trade name, industrial soap
Nonsoul SK-1: trade name of Nippon oil & Fats Co., Ltd.
A: Copolymer of acrylic acid and polyethylene glycol monomethacrylate, in which 60% of the total carboxylic acids is neutralized with sodium ion
B: Copolymer of acrylic acid and butyl methacrylate, in which 20% of the total carboxylic acids is neutralized with ammonium ion

EXAMPLE 1

To an aqueous 11.8 wt. % calcium hydroxide suspension 10 kg, citric acid (a chelating agent: pKa with Ca ion=3.16) was added in an amount of 5 wt. % to the amount of calcium carbonate (1.492 kg) to be theoretically obtained by the reaction and then under strongly stirring condition, 100% carbonic acid gas was blown at 12 l/min. rate to carry out carbonation and when pH reached 7.8, the reaction was finished. It is noted that water 2 kg was added at the time the viscosity of the reaction system reached the maximum during the carbonation reaction.

The obtained calcium carbonate suspension was dried by a spray drier and after pulverization by an impact stud mill Kolloplex manufactured by Alpine Corp., and being mixed with 9 wt. % of stearic acid, the calcium carbonate was surface-treated at 115° C. by using a Henshel mixer and further pulverized to obtain a dry powder having the following properties (dry treatment).

The obtained particle was in the form of an agglomerate comprising fine primary particles of calcium carbonate having the particle diameter dx of 0.01 μm measured by electron microscope observation and had an average particle diameter $dp_{50}$ of 2.14 μm, sharpness α of 1.89, a BET specific surface area Sw of 92 m²/g, tensile strength St needed to break the 4 μm agglomerate being 78 MPa, tensile strength Sta needed to break 30% of the 4 μm agglomerate being 480 MPa, and solidified apparent density ρpb being 0.41 g/cm³.

The production conditions of this example and physical properties of the obtained agglomerate of surface-treated calcium carbonate are shown in Table 1.

EXAMPLE 2

To an aqueous 11.2 wt. % calcium hydroxide suspension 10 kg, malic acid (a chelating agent: pKa with Ca ion=2.14) was added in an amount of 3 wt. % to the amount of calcium carbonate (1.417 kg) to be theoretically obtained by the reaction and then under strongly stirring condition, 100% carbonic acid gas was blown at 12 l/min. rate to carry out carbonation and when pH reached 7.4, the reaction was finished. It is noted that water 2 kg was added at the time the viscosity of the reaction system reached the maximum during the carbonation reaction.

The obtained calcium carbonate suspension was heated to 60° C. and under stirring condition, lauric acid in an amount of 7 wt. % to the amount of the calcium carbonate was dissolved in water 400 g heated to 65° C. and then the calcium carbonate suspension was added to carry out surface treatment (wet treatment).

The obtained surface-treated calcium carbonate was pressed by a press filter until the solid matter reached 53 wt. % and dried by Micron Drier to obtain a dry powder and the powder was pulverized by an atomizer to obtain a dry powder having the following properties.

The obtained particle was in the form of an agglomerate comprising fine primary particles of calcium carbonate having the particle diameter dx of 0.03 μm measured by electron microscope observation and had an average particle diameter $dp_{50}$ of 1.42 μm, sharpness a of 2.15, a BET specific surface area Sw of 76 m²/g, tensile strength St needed to break the 4 μm agglomerate being 45 MPa, tensile strength Sta needed to break 30% of the 4 μm agglomerate being 320 MPa, and solidified apparent density ρpb of 0.58 g/cm³.

The production conditions of this example and physical properties of the obtained agglomerate of surface-treated calcium carbonate are shown in Table 1.

EXAMPLES 3 TO 10 AND COMPARATIVE EXAMPLES 1 TO 3

Calcium carbonate was produced in the same manner as Examples 1 and 2 to obtain dried powders having the properties shown in Tables 1 and 2, except that calcium hydroxide concentrations and temperatures of calcium hydroxide suspensions, chelating agents and their addition amounts, carbonic acid gas flow rates, performance of stirring, water addition and amounts of water added at the time when the viscosity of the reaction systems reached the maximum, surface treatment agents and their addition amounts, and surface-treatment methods were changed as described in Tables 1 and 2.

EXAMPLE 11

In a double tubular reaction chamber having an inner cylinder and a gas diffusion plate, a 10.2 wt. % calcium hydroxide-water suspension 90 kg was mixed with citric acid (a chelating agent: pKa with Ca ion=3.16) in an amount of 5 wt. % to the amount of calcium carbonate (9.72 kg) to be theoretically obtained by the reaction and then 35% carbonic acid gas was blown at 280 l/min. rate and when pH reached 6.6, the reaction was finished.

The obtained calcium carbonate suspension was heated to 80° C. and under stirring condition, Nonsoul SK-1 (potassium stearate), industrial soap produced by Nippon Oil & Fats Co., Ltd., in an amount of 10 wt. % to the amount of the calcium carbonate was dissolved in water heated to 80° C. and then the obtained solution was added to the calcium carbonate suspension to carry out surface treatment (wet treatment).

Thereafter, pressing was carried out by a press filter until the solid matter reached 53 wt. % and the pressed product was dried by Micron Drier to obtain a dry powder and the powder was pulverized by an atomizer to obtain a dry powder having the following properties.

The obtained particle was in the form of an agglomerate comprising fine primary particles of calcium carbonate having the particle diameter dx of 0.01 μm measured by electron microscope observation and had an average particle diameter $dp_{50}$ of 2.45 μm, sharpness α of 1.71, a BET specific surface area Sw of 89 m²/g, tensile strength St needed to break the 4 μm agglomerate being 75 MPa, tensile strength Sta needed to break 30% of the 4 μm agglomerate being 460 MPa, and solidified apparent density ρpb being 0.42 g/cm³.

The production conditions of this example and physical properties of the obtained agglomerate of surface-treated calcium carbonate are shown in Table 1.

EXAMPLES 12 AND 13

Surface-treated calcium carbonate was produced in the same manner as Example 11 to obtain dried powders having the properties shown in Table 1, except that chelating agents to be added and their addition amounts, surface treatment agents to be used and their addition amounts, and surface-treatment methods were changed as described in Table 1.

COMPARATIVE EXAMPLE 4

A quick lime powder 670 g was added to ethylene glycol 4 kg and stirred and further ethylene glycol 15 kg was added to obtain a quick lime-ethylene glycol slurry. Carbonic acid gas in a concentration of 30 vol. % was blown at 66.7 l/min. rate to the slurry to carry out carbonation of the quick lime and obtain a resin additive of calcium carbonate.

The obtained calcium carbonate was dried by a gear oven and after pulverization by Kolloplex, the calcium carbonate was mixed with 7 wt. % of stearic acid, surface-treated at 115° C. by a Henshel mixer and further pulverized to obtain a dry powder of surface-treated calcium carbonate having physical properties shown in Table 3.

COMPARATIVE EXAMPLE 5

A 0.6 mol/l sodium carbonate solution, a 0.6 mol/l calcium chloride solution, and a 0.025 mol/l sodium hydroxide solution in an amount of 100 l, each, were produced and after the sodium carbonate solution and the sodium hydroxide solution were mixed, the mixed solution and the calcium chloride solution were respectively adjusted at 17.0° C. Thereafter, the calcium chloride solution 100 l was dropwise added for 270 seconds to the mixed solution of sodium carbonate and sodium hydroxide 200 l under stirring condition (50 rpm, hereinafter the same) to carry out carbonation reaction.

The obtained calcium carbonate suspension was left for 1 hour under stirring condition and sodium hexametaphosphate in an amount equivalent to 0.4 wt. % to that of calcium carbonate in the suspension was added and stirred for 20 minutes to obtain a calcium carbonate suspension.

The obtained calcium carbonate was washed with water by a rotary filter, dispersed by a homogenizer, dried by a spray drier, and after pulverization by Kolloplex, the calcium carbonate was mixed with 1 wt. % of stearic acid, surface-treated at. 115° C. by a Henshel mixer and further pulverized to obtain a dry powder of surface-treated calcium carbonate having physical properties shown in Table 3.

COMPARATIVE EXAMPLE 6

To a 7.8 wt. % calcium hydroxide-water suspension 10 kg, citric acid (a chelating agent: pKa with Ca ion=3.16) was added in an amount of 1.2 wt. % to the amount of calcium carbonate (1.417 kg) to be theoretically obtained by the reaction and then under strongly stirring condition, 30% carbonic acid gas was blown at 16 l/min. rate to carry out carbonation and when the carbonation ratio of the reaction solution reached 20%, the reaction was stopped.

Again, citric acid in the same amount as that in the previous treatment was added and under strongly stirring condition, 30% carbonic acid gas was blown at 16 l/min. rate to carry out carbonation and when the carbonation ratio of the reaction solution reached 30%, the reaction was stopped.

Further, citric acid in the same amount as that in the previous treatment was added and under strongly stirring condition, 30% carbonic acid gas was blown at 16 l/min. rate to carry out carbonation and when the carbonation ratio of the reaction solution reached 40%, the reaction was stopped.

Furthermore, citric acid in the same amount as that in the previous treatment was added and under strongly stirring condition, 30% carbonic acid gas was blown at 16 l/min. rate to carry out carbonation and the reaction was stopped.

The obtained calcium carbonate suspension was dried by a spray drier and after pulverization by Kolloplex, and being mixed with 17 wt. % of stearic acid, the calcium carbonate was surface-treated at 115° C. by using a Henshel mixer and further pulverized to obtain a dry powder having the following properties (dry treatment).

The physical properties of the agglomerate of the surface-treated calcium carbonate obtained in this comparative example are shown in Table 3.

COMPARATIVE EXAMPLE 7

A silica particle (Mizukasil P-527, produced by Mizusawa Industrial Chemicals Ltd.), which is a commercialized antiblocking agent for films was made ready and used as a resin additive.

The physical properties of the silica particle are shown in Table 3.

EXAMPLE 14

The calcium carbonate suspension of Example 1 was discharged after completion of the reaction and mixed with an acrylic acid-butyl methacrylate copolymer in which 20% of the total carboxylic acids were neutralized with ammonium ion in an amount of 4.5 wt. % to calcium carbonate in the suspension to carry out surface treatment and obtain surface-treated calcium carbonate.

After ethylene glycol was added to the obtained suspension, distillation was carried out to remove water and obtain an ethylene glycol suspension containing surface-treated agglomerate of calcium carbonate.

The physical properties of the particle obtained by drying the suspension are shown in Table 3.

EXAMPLES 15 to 20 AND COMPARATIVE EXAMPLES 8 TO 13

Ethylene glycol suspensions of surface-treated agglomerates were obtained by the same manner as Example 14, except that the suspensions of the agglomerates, the surface treatment agents and their treatment amounts were changed as shown in Tables 3 and 4.

The production conditions and the physical properties of the particles obtained by drying the suspensions are shown in Tables 3 and 4.

COMPARATIVE EXAMPLE 14

After the agglomerate obtained in Comparative Example 7 was suspended in water, an acrylic acid-butyl methacrylate copolymer in which 20% of the total carboxylic acids were neutralized with ammonium ion in an amount of 15 wt. % to silica in the suspension was added to carry out surface treatment and obtain surface-treated silica.

After ethylene glycol was added to the obtained suspension, distillation was carried out to remove water and obtain an ethylene glycol suspension containing surface-treated agglomerate.

TABLE 1

| | Example 1 | Example 2 | Example 3 | Example 4 | Example 5 | Example 6 | Example 7 | Example 8 |
|---|---|---|---|---|---|---|---|---|
| Production conditions | | | | | | | | |
| Calcium hydroxide suspension | | | | | | | | |
| Suspension amount [kg] | 10 | 10 | 10 | 10 | 10 | 10 | 10 | 10 |
| Concentration [%] | 11.8 | 11.2 | 10.2 | 12.5 | 11.2 | 10.2 | 10.2 | 8.8 |
| Liquid temperature [° C.] | 12 | 12 | 24 | 3 | 12 | 12 | 12 | 24 |
| Chelating agent | citric acid | malic acid | NTA | citric acid | HEDTA | maleic acid | citric acid | citric acid |
| Stabilizing constant pKa [—] | 3.16 | 2.14 | 6.56 | 3.16 | 8.51 | 3.16 | 3.16 | 3.16 |
| Amount added [wt %] | 5 | 3 | 5 | 9 | 5 | 5 | 2.5 | 1.5 |
| Carbonic acid gas | | | | | | | | |
| Concentration [%] | 100 | 100 | 100 | 100 | 100 | 100 | 100 | 100 |
| Flow rate [l/min.] | 12 | 11.5 | 10.5 | 15 | 10.5 | 10.5 | 6.2 | 5.5 |
| Reaction vessel | stirred | stirred | not stirred | stirred | not stirred | stirred | stirred | not stirred |
| Water added [kg] | 2 | 2 | — | 4 | — | — | — | — |
| Surface treatment | | | | | | | | |
| Surface treatment agent | stearic acid | lauric acid | 2-ethylhexyl phosphate | potassium myristate | stearic acid stearyl | monooleic acid sorbitan | DBS | DBS-Na |
| Amount treated [wt %] | 9 | 7 | 4 | 15 | 6 | 5 | 6 | 5 |
| Treatment method | dry | wet | wet | wet | wet | wet | dry | wet |

TABLE 1-continued

| Physical properties of particle | | | | | | | | |
|---|---|---|---|---|---|---|---|---|
| $dp_{50}$ Average particle diameter [μm] | 2.14 | 1.42 | 11.36 | 3.48 | 1.66 | 4.88 | 1.62 | 1.54 |
| α Sharpness [—] | 1.89 | 2.15 | 1.48 | 1.99 | 2.04 | 2.45 | 2.43 | 2.37 |
| Sw BET specific surface area [m$^2$/g] | 92 | 76 | 42 | 158 | 58 | 55 | 62 | 45 |
| St Tensile strength [MPa] | 78 | 45 | 41 | 97 | 23 | 40 | 43 | 38 |
| Sta Tensile strength (30%) [MPa] | 480 | 320 | 310 | 480 | 300 | 210 | 320 | 280 |
| ρbp Solidified apparent density [g/cm$^3$] | 0.41 | 0.58 | 0.59 | 0.45 | 0.41 | 0.43 | 0.62 | 0.21 |
| dx Primary particle diameter [μm] | 0.01 | 0.03 | 0.09 | 0.03 | 0.05 | 0.09 | 0.04 | 0.05 |

| | Example 9 | Example 10 | Example 11 | Example 12 | Example 13 |
|---|---|---|---|---|---|
| Production conditions | | | | | |
| Calcium hydroxide suspension | | | | | |
| Suspension amount [kg] | 10 | 10 | 90 | 90 | 90 |
| Concentration [%] | 7.2 | 7.2 | 10.2 | 10.2 | 10.2 |
| Liquid temperature [°C.] | 28 | 28 | 12 | 12 | 12 |
| Chelating agent | citric acid | hexameta phosphoric acid | citric acid | citric acid | citric acid malic acid |
| Stabilizing constant pKa [—] | 3.16 | | 3.16 | 3.16 | — |
| Amount added [wt %] | 1.5 | 5 | 5 | 5 | 2.5 each |
| Carbonic acid gas | | | | | |
| Concentration [%] | 100 | 100 | 35 | 35 | 35 |
| Flow rate [l/min.] | 3 | 3 | 320 | 320 | 320 |
| Reaction vessel | not stirred | not stirred | double tubular reaction chamber | double tubular reaction chamber | double tubular reaction chamber |
| Water added [kg] | — | — | — | — | — |
| Surface treatment | | | | | |
| Surface treatment agent | vinyltrimethoxysilane | Marceill soap | Nonsoul SK-1 | — | stearic acid |
| Amount treated [wt %] | 4 | 3 | 10 | — | 10 |
| Treatment method | dry | wet | wet | — | dry |
| Physical properties of particle | | | | | |
| $dp_{50}$ Average particle diameter [μm] | 4.78 | 18.6 | 2.45 | 2.43 | 1.88 |
| α Sharpness [—] | 2.4 | 2.44 | 1.71 | 1.68 | 2.28 |
| Sw BET specific surface area [m$^2$/g] | 38 | 32 | 89 | 102 | 93 |
| St Tensile strength [MPa] | 40 | 23 | 75 | 77 | 78 |
| Sta Tensile strength (30%) [MPa] | 480 | 230 | 460 | 460 | 450 |
| ρbp Solidified apparent density [g/cm$^3$] | 0.87 | 0.91 | 0.42 | 0.44 | 0.41 |
| dx Primary particle diameter [μm] | 0.07 | 0.09 | 0.01 | 0.01 | 0.01 |

TABLE 2

| | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Production conditions | | | | | | | |
| Calcium hydroxide suspension | | | | | | | |
| Suspension amount [kg] | 10 | 10 | 10 | — | — | 10 | — |
| Concentration [%] | 5.3 | 5.3 | 7.8 | — | — | 7.8 | — |
| Liquid temperature [°C.] | 12 | 12 | 12 | — | — | 13 | — |
| Chelating agent | citric acid | citric acid | — | — | — | citric acid | — |
| Stabilizing constant pKa [—] | 3.16 | 3.16 | — | — | — | 3.16 | — |
| Amount added [wt %] | 5 | 5 | — | — | — | 1.2 | — |
| Carbonic acid gas | | | | | | | |
| Concentration [%] | 100 | 100 | 100 | — | — | 30 | — |
| Flow rate [l/min.] | 7.4 | 2 | 4.7 | — | — | 16 | — |
| Reaction vessel | stirred | not stirred | not stirred | — | — | — | — |
| Water added [kg] | 2 | — | — | — | — | — | — |
| Surface treatment | | | | | | | |
| Surface treatment agent | stearic acid | stearic acid | stearic acid | stearic acid | stearic acid | stearic acid | — |
| Amount treated [wt %] | 10 | 10 | 3 | 5 | 1 | 10 | — |
| Treatment method | dry | dry | dry | dry | dry | dry | — |
| Physical properties of particle | | | | | | | |
| $dp_{50}$ Average particle diameter [μm] | 0.48 | 4.82 | 1.86 | 0.86 | 2.58 | 5.8 | 3.13 |
| α Sharpness [—] | 2.48 | 4.52 | 2.03 | 3.25 | 0.62 | 4.29 | 3.87 |

TABLE 2-continued

|  | Comp. Ex. 1 | Comp. Ex. 2 | Comp. Ex. 3 | Comp. Ex. 4 | Comp. Ex. 5 | Comp. Ex. 6 | Comp. Ex. 7 |
|---|---|---|---|---|---|---|---|
| Sw BETspecific surface area [m²/g] | 98 | 60 | 28 | 64 | 0.8 | 170 | 435 |
| St Tensile strength [MPa] | 78 | 78 | 9 | 25 | 180 | 16 | 125 |
| Sta Tensile strength (30%) [MPa] | 490 | 490 | 80 | 180 | 950 | 190 | 620 |
| ρbp Solidified apparent density [g/cm³] | 0.56 | 0.49 | 0.77 | 0.68 | 1.48 | 0.38 | 0.11 |
| dx Primary particle diameter [μm] | 0.01 | 0.01 | 0.09 | 0.01 | 2.52 | 0.12 | 0.01 |

TABLE 3

| Aggromerate used (calcium carbonate) | Example 14 Example 1 | Example 15 Example 3 | Example 16 Example 5 | Example 17 Example 6 | Example 18 Example 9 | Example 19 Example 12 | Example 20 Example 13 |
|---|---|---|---|---|---|---|---|
| Surface treatment |  |  |  |  |  |  |  |
| Surface treatment agent | A | B | A | A | A | — | A |
| Amount treated [wt %] | 4.5 | 2 | 3 | 2.5 | 2 | — | 5 |
| Treatment method | wet | wet | wet | wet | wet | — | wet |
| Physical properties of particle |  |  |  |  |  |  |  |
| dp₅₀ Average particle diameter [μm] | 2.32 | 15.43 | 1.52 | 4.54 | 4.51 | 2.34 | 1.82 |
| α Sharpness [—] | 1.76 | 1.55 | 1.94 | 2.38 | 2.16 | 1.56 | 2.14 |
| Sw BETspecific surface area [m²/g] | 90 | 43 | 61 | 59 | 41 | 96 | 89 |
| St Tensile strength [MPa] | 75 | 42 | 20 | 42 | 45 | 79 | 77 |
| Sta Tensile strength (30%) [MPa] | 470 | 300 | 310 | 200 | 470 | 480 | 460 |
| ρbp Solidified apparent density [g/cm³] | 0.46 | 0.55 | 0.42 | 0.44 | 0.89 | 0.41 | 0.45 |
| dx Primary particle diameter [μm] | 0.01 | 0.09 | 0.05 | 0.09 | 0.07 | 0.01 | 0.01 |

TABLE 4

| Aggromerate used | Comp. Ex. 8 Comp. Ex. 1 | Comp. Ex. 9 Comp. Ex. 2 | Comp. Ex. 10 Comp. Ex. 3 | Comp. Ex. 11 Comp. Ex. 4 | Comp. Ex. 12 Comp. Ex. 5 | Comp. Ex. 13 Comp. Ex. 6 | Comp. Ex. 14 Comp. Ex. 7 |
|---|---|---|---|---|---|---|---|
| Surface treatment |  |  |  |  |  |  |  |
| Surface treatment agent | A | B | A | A | A | A | A |
| Amount treated [wt %] | 5 | 5 | 1.5 | 3.5 | 0.4 | 10 | 15 |
| Treatment method | wet | wet | wet | wet | wet | wet | wet |
| Physical properties of particle |  |  |  |  |  |  |  |
| dp₅₀ Average particle diameter [μm] | 0.46 | 4.77 | 1.82 | 0.94 | 2.55 | 5.8 | 3.12 |
| α Sharpness [—] | 2.39 | 4.3 | 2 | 3.33 | 0.61 | 4.29 | 3.62 |
| Sw BETspecific surface area [m²/g] | 96 | 58 | 25 | 72 | 0.8 | 170 | 410 |
| St Tensile strength [MPa] | 75 | 75 | 11 | 27 | 190 | 14 | 118 |
| Sta Tensile strength (30%) [MPa] | 480 | 490 | 70 | 170 | 880 | 180 | 610 |
| ρbp Solidified apparent density [g/cm³] | 0.59 | 0.47 | 0.8 | 0.7 | 1.51 | 0.38 | 0.14 |
| dx Primary particle diameter [μm] | 0.01 | 0.01 | 0.09 | 0.01 | 2.52 | 0.12 | 0.01 |

EXAMPLES 21 TO 33 AND COMPARATIVE EXAMPLES 15 TO 21

The agglomerates obtained in Examples 1 to 13 and Comparative Examples 1 to 7 in 0.5 parts by weight, respectively, were added to 100 parts by weight of polypropylene homopolymer (Novatec PP FL6CK: MFR 2.5 g/min, I.I 95.5%, produced by Nippon Polychem. Co., Ltd.) and mixed for 5 minutes by a Henshel mixer to obtain particle-resin mixtures.

Using each of the obtained mixtures, extrusion molding was carried out by a three-layer die so as to form a laminate sheet with three-layer structure comprising the polypropylene homopolymer sandwiched by the mixture and each obtained laminate sheet was drawn 5 times in the longitudinal direction at a temperature of 115° C. by utilizing the peripheral speed difference of rolls and then drawn 9 times in the width direction in a tenter oven at 165° C. to obtain two types of three-layer films with 22 μm thickness in the center layer and 1.5 μm thickness in both surface layers.

One side surface of each of the obtained films was subjected to corona discharge treatment to obtain a biaxially drawn polypropylene film.

Results of physical evaluation of each of the obtained biaxially drawn films are shown in Tables 5 and 6.

(1) Particle Dispersibility in Biaxially Drawn Polypropylene Film

Obtained sheets were observed by a transmission microscope and evaluated according to the following criteria.

⊚: no agglomerates or coarse particles were observed.

○: agglomerates or coarse particles were slightly observed.

Δ: many agglomerates or coarse particles were observed.

(2) Anti-Blocking Property

Two sheets of film were overlapped each other having the contact surface area of 10 cm², and sandwiched between two glass plates and left under conditions of 50 g/cm² load and 40° C. temperature for 72 hours, the maximum load needed to separate the sheets by a Shopper type tester was measured.

(3) Haze

According to ASTM-D 1003-61T, measurement was carried out by Poick Integration Spherical Haze Meter (SEP HS-30D, manufactured by Nippon Seimitsu Kogaku Co.).

(4) Gloss

According to JIA-K7105, measurement was carried out at 20° C.

(5) Scratch Resistance Property

A sample film was wound around a sledge of a slip tester with a square shape of 63 cm length in each side and slid 30 times on another sample film at 3 kg load and then the alteration of the haze was measured.

(6) Comprehensive Evaluation
  ⊚: outstandingly excellent
  ○: good
  Δ: slightly poor
  ×: poor C.). The polyethylene terephthalate was dried at 160° C., melted at 290° C., extruded, and quenched and solidified on a casting drum kept at 40° C. to obtain an undrawn film. Successively, the undrawn film was previously heated to 70° C. by a heating roller and then drawn in the vertical direction while being heated by an IR heater. Next, after drawing in the horizontal direction was carried out at 90° C., the film was heated at 200° C. to obtain a 5.7 μm thick biaxially oriented film. The quality of each film obtained in such a manner was evaluated according to the following methods. The results are shown in Tables 7 and 8.

(1) Particle Dispersibility in Biaxially Drawn Polyethylene Terephthalate Film

Obtained polyester compositions were observed by a transmission microscope and evaluated according to the following criteria.
  ⊚: no agglomerates or coarse particles were observed.
  ○: agglomerates or coarse particles were slightly observed.
  Δ: many agglomerates or coarse particles were observed.

(2) Specific Resistance (ρ) at the Time of Melting of Polyester Composition

Each film was melted at 285° C. and then the specific resistance of it was measured. Incidentally, it is commonly

TABLE 5

| Agglomerate used | Example 21 Example 1 | Example 22 Example 2 | Example 23 Example 3 | Example 24 Example 4 | Example 25 Example 5 | Example 26 Example 6 | Example 27 Example 7 |
|---|---|---|---|---|---|---|---|
| Dispersibility of agglomerate | ⊚ | ⊚ | ○ | ⊚ | ○~⊚ | ⊚ | ○ |
| Anti-blocking [g/10 cm²] | 170 | 230 | 290 | 240 | 320 | 220 | 295 |
| Haze [%] | 0.9 | 1.1 | 1.3 | 1.2 | 1.4 | 1.2 | 1.4 |
| Gloss [%] | 130 | 135 | 128 | 138 | 132 | 133 | 135 |
| Scratch resistance [%] | 0.2 | 0.3 | 0.4 | 0.4 | 0.3 | 0.4 | 0.2 |
| Comprehensive evaluation | ⊚ | ○~⊚ | ○ | ○~⊚ | ○~⊚ | ○~⊚ | ○ |

| Agglomerate used | Example 28 Example 8 | Example 29 Example 9 | Example 30 Example 10 | Example 31 Example 11 | Example 32 Example 12 | Example 33 Example 13 |
|---|---|---|---|---|---|---|
| Dispersibility of agglomerate | ⊚ | ○~⊚ | ○~⊚ | ○ | ○ | Δ |
| Anti-blocking [g/10 cm²] | 230 | 270 | 300 | 290 | 310 | 370 |
| Haze [%] | 1.1 | 1.3 | 1.4 | 1.4 | 1.4 | 1.6 |
| Gloss [%] | 129 | 131 | 136 | 131 | 132 | 134 |
| Scratch resistance [%] | 0.3 | 0.4 | 0.3 | 0.4 | 0.3 | 0.6 |
| Comprehensive evaluation | ○~⊚ | ○~⊚ | ○~⊚ | ○ | ○~⊚ | Δ |

TABLE 6

| Agglomerate used | Comp. Ex. 15 Comp. Ex. 1 | Comp. Ex. 16 Comp. Ex. 2 | Comp. Ex. 17 Comp. Ex. 3 | Comp. Ex. 18 Comp. Ex. 4 | Comp. Ex. 19 Comp. Ex. 5 | Comp. Ex. 20 Comp. Ex. 6 | Comp. Ex. 21 Comp. Ex. 7 |
|---|---|---|---|---|---|---|---|
| Dispersibility of agglomerate | ○ | ○ | ○~⊚ | ○ | Δ | ○ | ⊚ |
| Anti-blocking [g/10 cm²] | 480 | 510 | 435 | 330 | 340 | 780 | 435 |
| Haze [%] | 1.9 | 1.7 | 1.8 | 1.6 | 1.4 | 1.8 | 1.7 |
| Gloss [%] | 139 | 142 | 143 | 147 | 137 | 148 | 143 |
| Scratch resistance [%] | 0.9 | 0.7 | 0.9 | 0.8 | 1.1 | 0.7 | 0.9 |
| Comprehensive evaluation | X | X | X | X | X | X | X |

EXAMPLES 34 TO 40 AND COMPARATIVE EXAMPLES 22 TO 28

Each of the ethylene glycol slurries of Examples 14 to 20 and Comparative Examples 8 to 14 was added before polyesterification reaction and then the polyesterification reaction was carried out to produce polyethylene terephthalate containing 0.3 wt. % of an anti-blocking agent and a limiting viscosity number of 0.62 dl/g (o-chlorophenol, 35° C.). carried out that the amount of a catalyst metal to be added is decreased in the production of polyesters or that a phosphorus compound such as a phosphoric acid or a phosphoric acid ester is added in order to suppress the activity of the metal.

In the present invention, as a catalytic metal, lithium acetate was added in a concentration of 100 ppm to the polyester and, further, phosphoric acid in the same concentration was added for the measurement.

(3) Wear Resistance Evaluation of Film (I)

A sample obtained by slitting a film into ½ inch width was made and using a tape running tester illustrated in FIG. 1, the sample was brought into contact with a fixed pin 7 made of a stainless (surface roughness 0.58 μm) at an angle of 150 degree and reciprocated about 15 cm at a rate of 2 m/min. In this case, the inlet side tension was controlled to be 70 g.

After the above-mentioned movement was carried out 50 times, the scratches formed in the contact face with the fixed pin were observed by eye observation and the wear resistance was evaluated according to the following criteria.

In FIG. 1, 1: unwinding reel; 2: tension controller; 3, 5, 6, 8, 9 and 11: free roller; 4: tension detector (inlet); 7: fixing bar; 10: tension detector (ourlet); 12: guide roller; and 13: winding reel.

◎: scratches were scarcely formed.
○: scratches were slightly formed.
Δ: scratch formation took place in almost a half of the surface.
×: scratch formation took place in the entire surface.

(4) Wear Resistance Evaluation of Film (II)

Cutting property of a film running face was evaluated using 5-step mini-supercalender. The calendar employed was a 5-step calender comprising nylon rolls and steel rolls and the treatment temperature was 80° C. and the linear pressure applied to each film was 200 kg/cm and the film was moved at 70 m/min.

The cutting property of the film was evaluated according to the following criteria on the basis of the stains adhering to the top roller of the calendar at the time the film was moved in 3,000 m length.

◎: nylon roll was not stained at all.
○: nylon roll was scarcely stained.
Δ: nylon roll was stained
×: nylon roll was extremely stained (5) The Number of Coarse Projections in Film Surface After a thin film of aluminum was deposited in each film surface, the number (the number per 1 mm$^2$ measurement surface area) of coarse projections having quartet or higher rings was counted by using a two-beam interferometric microscope and based on the number of the coarse projections, the film was evaluated according to the following criteria.

1 class: 16 projections or more
2 class: 10 to 15 projections
3 class: 6 to 9 projections
4 class: 2 to 5 projections
5 class: 0 to 1 projection (6) Dielectric Breakdown Voltage of Film Using an a.c. withstand voltage tester, measurement was carried out according to JIS-C2318.

That is, using a 10 kV d.c. withstand voltage tester, voltage was increased at 100 V/sec. in atmosphere of 23° C. and 50% RH and the voltage at the time a sample film was broken and short-circuited was measured.

(7) Insulation Resistance

Using a resistance heating type metal evaporation apparatus, on the surface of each obtained polyester film, a 350 angstroms thick aluminum was deposited in stripes having margin parts (stripes formed of reciprocally repeated 8 mm deposition parts and 1 mm margin parts) in the longitudinal direction of the polyester film under a pressure in a vacuum chamber set at 0.1 Pa or less.

The obtained aluminum-deposited polyester film was slit into a tape-like shape having 4.5 mm width and margin parts of 1 mm width in right and left sides.

Further, each one sheets of aluminum-deposited films having a left margin and a right margin, respectively, were wound in such a manner the deposited parts came out by 0.5 mm each in the width direction to obtain a coil.

The coil was pressed at a temperature of 140° C. and a pressure of 5,000 pKa for 5 minutes and as lead wires, Metallikon was melted and bonded to both end faces of the coil after the pressing and after that, the resulting coil was impregnated with a liquid-phase epoxy resin and coated with an outer coating with a thickness of 0.5 mm by heating and melting a powder-state epoxy resin to obtain a film capacitor with an electrostatic capacity of 0.1 μF.

The electrostatic capacity [C] of the obtained film capacitor was measured in atmosphere of 23° C. and 50% RH by using a LCR meter 4284A manufactured by Yokogawa HP Co.

Further, the obtained film capacitor was subjected to the resistance value R measurement by applying d.c. voltage of 100 V between the electrodes of the capacitor at 23° C. using a high resistance meter 4329A manufactured by Yokogawa HP Co.

The resistance value R became maximum immediately after the voltage application and then decreased and therefore, the maximum value was defined as R value.

The insulation resistance evaluation of each capacitor was carried out based on the product [C×R] of the above-mentioned electrostatic capacity and the resistance value.

(8) Comprehensive Evaluation

◎: outstandingly excellent
○: good
Δ: slightly poor
×: poor

TABLE 7

| Agglomerate used | Example 34 Example 14 | Example 35 Example 15 | Example 36 Example 16 | Example 37 Example 17 | Example 38 Example 18 | Example 39 Example 19 | Example 40 Example 20 |
|---|---|---|---|---|---|---|---|
| Dispersibility of agglomerate | ◎ | ◎ | ◎ | ◎ | ○ | ○ | Δ |
| Specific resistance(ρ[Ω · cm]) | $4 \times 10^8$ | $2.3 \times 10^8$ | $1.8 \times 10^8$ | $2.9 \times 10^8$ | $1.8 \times 10^8$ | $1.2 \times 10^8$ | $1.2 \times 10^8$ |
| Wear resistance I | ◎ | ◎ | ○ | ◎ | ◎ | ○ | ○ |
| Wear resistance II | ◎ | ○ | ◎ | ◎ | ○ | ◎ | ○ |
| Number of coarse projections | 5 class | 4 class | 4 class | 5 class | 4 class | 4 class | 3 class |
| Dielectric breakdown voltage [V · μm] | 830 | 730 | 720 | 780 | 720 | 710 | 670 |
| Insulation resistance [C × R [Ω · F]] | $4 \times 10^4$ | $1.5 \times 10^4$ | $1.6 \times 10^4$ | $2.4 \times 10^4$ | $1.2 \times 10^4$ | $1.6 \times 10^4$ | $8 \times 10^3$ |
| Comprehensive evaluation | ◎ | ○ | ○ | ◎ | ○ | ○ | Δ |

TABLE 8

|  | Comp. Ex. 22 Comp. Ex. 8 | Comp. Ex. 23 Comp. Ex. 9 | Comp. Ex. 24 Comp. Ex. 10 | Comp. Ex. 25 Comp. Ex. 11 | Comp. Ex. 26 Comp. Ex. 12 | Comp. Ex. 27 Comp. Ex. 13 | Comp. Ex. 28 Comp. Ex. 14 |
|---|---|---|---|---|---|---|---|
| Agglomerate used |  |  |  |  |  |  |  |
| Dispersibility of agglomerate | Δ | ○ | Δ | Δ | Δ | ○ | ○ |
| Specific resistance($\rho[\Omega \cdot cm]$) | $6.9 \times 10^5$ | $5.5 \times 10^5$ | $7.1 \times 10^5$ | $1 \times 10^5$ | $8.2 \times 10^5$ | $1 \times 10^7$ | $2.3 \times 10^8$ |
| Wear resistance I | ○ | X | ○ | ○ | ○ | ○ | Δ |
| Wear resistance II | Δ | Δ | Δ | Δ | Δ | ○ | X |
| Number of coarse projections | 3 class | 3 class | 3 class | 3 class | 3 class | 3 class | 1 class |
| Dielectric breakdown voltage [V · μm] | 450 | 380 | 400 | 350 | 350 | 420 | 250 |
| Insulation resistance [C × R [$\Omega \cdot F$]] | $8.6 \times 10^3$ | $8.4 \times 10^3$ | $7.9 \times 10^3$ | $2.3 \times 10^2$ | $8.8 \times 10^3$ | $6.9 \times 10^3$ | $7.8 \times 10$ |
| Comprehensive evaluation | X | X | X | X | X | X | X |

INDUSTRIAL APPLICABILITY

As described above, an agglomerate of the present invention has good affinity with a resin and a proper stress moderating function and is capable of providing a good slipping property to a resin composition of films and fibers. Accordingly, the agglomerate of the present invention can provide a resin composition excellent in the anti-blocking property and the scratching resistance property.

The invention claimed is:

1. An agglomerate comprising fine primary particles of a synthesized calcium carbonate, the agglomerate satisfying the following expressions (a) to (e):

$$0.5 \leq dp_{50} \leq 20 \; [\mu m] \tag{a}$$

$$0 \leq \alpha \leq 2.5 \; [-] \tag{b}$$

$$30 \leq Sw \; [m^2/g] \tag{c}$$

$$20 \leq St \leq 150 \; [MPa] \tag{d}$$

$$200 \leq Sta \leq 600 \; [MPa] \tag{e},$$

wherein $dp_{50}$: the average particle diameter [μm] of the agglomerate measured by Microtrac-FRA, a laser analysis type particle size distribution measurement apparatus, α: the value calculated by dividing the difference between the particle diameter $d_{90}$ of cumulative 90% minus sieve particles of the agglomerate and the particle diameter $d_{10}$ of cumulative 10% minus sieve particles of the agglomerate calculated by the Microtrac-FRA, a laser analysis type particle size distribution measurement apparatus by the average particle diameter $dp_{50}$ according to the following equation:

$$\alpha = (d_{90} - d_{10})/dp_{50},$$

$d_{90}$: the particle diameter of cumulative 90% minus sieve particles of the agglomerate measured by the Microtrac-FRA, a laser analysis type particle size distribution measurement apparatus, $d_{10}$: the particle diameter of cumulative 10% minus sieve particles of the agglomerate measured by the Microtrac-FRA, a laser analysis type particle size distribution measurement apparatus, Sw: the BET specific surface area of the agglomerate [$m^2/g$], St: the tensile strength [MPa] required to break the agglomerate with the particle diameter 4 μm, measured by a MCT-W500-J micro compression testing machine manufactured by Shimadzu Corporation under conditions of 9.8 mN in load and 0.892405 mN/sec in load speed, and Sta: the tensile strength [MPa] required to break 30% of the particle diameter of the agglomerate with the particle diameter 4 μm, measured by a MCT-W500-J micro compression testing machine manufactured by Shimadzu Corporation under conditions of 9.8 mN in load and 0.892405 mN/sec in load speed.

2. The agglomerate according to claim 1, wherein the agglomerate satisfies the solidified apparent density satisfies the following expression (f):

$$0.2 \leq \rho bp \leq 0.8 \; [g/cm^3], \tag{f}$$

wherein

ρbp: the solidified apparent density [$g/cm^3$] of the agglomerate powder measured by a powder tester manufactured by Hosokawa Micron Co., Ltd., based on the Carr Theory.

3. The agglomerate according to claim 1, wherein the agglomerate is surface-treated with at least one kind selected from aliphatic acids, alicyclic carboxylic acids, aromatic carboxylic acids, their sulfonic acids and resin acids, their metal salts, ammonium salts, amine salts, esters; aliphatic, alicyclic, and aromatic sulfonic acids; coupling agents; silicone oils; paraffin; copolymers of α,β-monoethylenically unsaturated carboxylic acids and monomers copolymerizable with α,β-monoethylenically unsaturated carboxylic acids, their metal salts ammonium salts, amine salts, esters; phosphoric acid esters; and industrial soaps.

4. A resin composition containing a resin mixed with the agglomerate according to claim 1.

5. The resin composition according to claim 4, wherein the resin is selected from polyolefin resins, polyester resins, polyamide resins, polyvinyl chloride resins, and biodegradable resins.

6. The resin composition according to claim 4, wherein the resin composition is in the form of a film, a sheet or a fiber.

7. The agglomerate according to claim 2, wherein the agglomerate is surface-treated with at least one kind selected from aliphatic acids, alicyclic carboxylic acids, aromatic carboxylic acids, their sulfonic acids and resin acids, their metal salts, ammonium salts, amine salts, esters; aliphatic, alicyclic, and aromatic sulfonic acids; coupling agents; silicone oils; paraffin; copolymers of α,β-monoethylenically unsaturated carboxylic acids and monomers copolymerizable with α,β-monoethylenically unsaturated carboxylic acids, their metal salts ammonium salts, amine salts, esters; phosphoric acid esters; and industrial soaps.

8. The agglomerate according to claim 2, wherein the agglomerate comprises calcium carbonate.

9. The agglomerate according to claim 3, wherein the agglomerate comprises calcium carbonate.

10. A resin composition containing a resin mixed with the agglomerate according to claim 2.

11. A resin composition containing a resin mixed with the agglomerate according to claim 3.

12. The resin composition according to claim 10, wherein the resin is selected from polyolefin resins, polyester resins, polyamide resins, polyvinyl chloride resins, and biodegradable resins.

13. The resin composition according to claim 11, wherein the resin is selected from polyolefin resins, polyester resins, polyamide resins, polyvinyl chloride resins, and biodegradable resins.

\* \* \* \* \*